US010349297B2

(12) United States Patent
Hui et al.

(10) Patent No.: US 10,349,297 B2
(45) Date of Patent: *Jul. 9, 2019

(54) QUALITY OF USER EXPERIENCE ANALYSIS

(71) Applicant: T-Mobile USA, Inc., Bellevue, WA (US)

(72) Inventors: Jie Hui, Mercer Island, WA (US); Zachary William McPherson, Seattle, WA (US); Kranthi Sontineni, Renton, WA (US); Peter P. Myron, Renton, WA (US); Himesh Bagley, Seattle, WA (US); Jeffery A. Smith, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/235,987

(22) Filed: Aug. 12, 2016

(65) Prior Publication Data

US 2016/0352599 A1 Dec. 1, 2016

Related U.S. Application Data

(63) Continuation of application No. 14/183,300, filed on Feb. 18, 2014, now Pat. No. 9,538,409, which is a
(Continued)

(51) Int. Cl.
*H04W 24/10* (2009.01)
*H04L 12/26* (2006.01)
(Continued)

(52) U.S. Cl.
CPC ........... *H04W 24/10* (2013.01); *H04L 43/045* (2013.01); *H04L 43/08* (2013.01); *H04W 24/08* (2013.01); *H04W 76/27* (2018.02)

(58) Field of Classification Search
CPC . H04L 43/12; H04L 41/5025; H04L 41/5067; H04L 65/80; H04L 5/0035;
(Continued)

(56) References Cited

U.S. PATENT DOCUMENTS 6,058,102 A 5/2000 Drysdale et al.
7,143,006 B2 11/2006 Ma et al.
(Continued)

FOREIGN PATENT DOCUMENTS

JP 2009260652 11/2009
WO WO2014166523 10/2014
WO WO2015053788 4/2015

OTHER PUBLICATIONS

Office Action for U.S. Appl. No. 14/803,769, dated Jul. 28, 2017, Jong Sung Yoon, "Quality of User Experience Analysis", 10 pages.
(Continued)

*Primary Examiner* — Jung Liu
(74) *Attorney, Agent, or Firm* — Lee & Hayes, P.C.

(57) ABSTRACT

The techniques described herein involve analysis of communication data included in trace file(s) of device(s) involved in a communication. These trace file(s) may each include data associated with multiple layers of a communication protocol stack of a respective device or data associated with a single such layer. The techniques may further involve one or more of determination of performance metrics associated with data at a specific layer of a specific device, correlation of the data between layers of a device, or correlation of data across multiple device(s) involved in the communication. The performance metrics or correlated data may then be analyzed based on thresholds or models to determine whether the performance metrics or correlated data exhibits a degraded quality of user experience. Also or
(Continued)

instead, graphic or textual representations of the performance metrics or correlated data may be generated.

20 Claims, 18 Drawing Sheets

Related U.S. Application Data continuation-in-part of application No. 13/738,799, filed on Jan. 10, 2013, now Pat. No. 9,237,474.

(60) Provisional application No. 61/719,929, filed on Oct. 29, 2012.

(51) Int. Cl.
*H04W 24/08* (2009.01)
*H04W 76/27* (2018.01)

(58) Field of Classification Search
CPC . H04L 5/0055; H04L 5/0057; H04L 12/2869; H04L 12/5695; H04L 47/00; H04L 47/70; H04L 47/78; H04L 47/821; H04L 47/827; H04H 60/32; H04N 21/4667; H04N 21/442; H04N 21/64738; H04W 72/04
See application file for complete search history.

(56) References Cited

U.S. PATENT DOCUMENTS

| | | |
|---|---|---|
| 7,292,537 B2 | 11/2007 | Charcranoon |
| 7,380,264 B2 | 5/2008 | Potrebic |
| 7,424,526 B1 | 9/2008 | Hansen et al. |
| 7,436,778 B1 | 10/2008 | Iannaccone et al. |
| 7,496,040 B2 | 2/2009 | Seo |
| 7,577,701 B1 | 8/2009 | Johns et al. |
| 7,577,736 B1 | 8/2009 | Ovenden |
| 7,760,653 B2 | 7/2010 | Poletto |
| 7,761,272 B1 | 7/2010 | Janneck et al. |
| 7,782,793 B2 | 8/2010 | Olesinski et al. |
| 7,904,079 B1 | 3/2011 | Lundy et al. |
| 7,916,649 B2 | 3/2011 | Buvaneswari et al. |
| 7,916,653 B2 | 3/2011 | Firestone et al. |
| 7,929,512 B2 | 4/2011 | Malomsoky et al. |
| 7,936,688 B2 | 5/2011 | Klotz et al. |
| 8,005,012 B1 | 8/2011 | Aybay et al. |
| 8,095,640 B2 | 1/2012 | Guingo et al. |
| 8,179,799 B2 | 5/2012 | Dolisy |
| 8,213,323 B1 | 7/2012 | Papagiannaki |
| 8,355,316 B1 | 1/2013 | Lushear et al. |
| 8,370,369 B2 | 2/2013 | Veres et al. |
| 8,374,102 B2 | 2/2013 | Luft et al. |
| 8,477,772 B2 | 7/2013 | Gerber et al. |
| 8,527,627 B2 | 9/2013 | Gerber et al. |
| 8,601,113 B2 | 12/2013 | Dolisy |
| 8,631,052 B1 | 1/2014 | Shilane et al. |
| 8,665,733 B2 | 3/2014 | Eskicioglu et al. |
| 8,850,578 B2 | 9/2014 | French et al. |
| 8,879,415 B2 | 11/2014 | Labovitz et al. |
| 2001/0050903 A1 | 12/2001 | Vanlint |
| 2005/0163047 A1 | 7/2005 | McGregor et al. |
| 2006/0176824 A1 | 8/2006 | Laver et al. |
| 2007/0129086 A1 | 6/2007 | Toone |
| 2009/0149143 A1 | 6/2009 | Rokusek et al. |
| 2010/0142457 A1 | 6/2010 | Chun et al. |
| 2010/0165836 A1 | 7/2010 | Wahlqvist et al. |
| 2010/0169961 A1 | 7/2010 | Huh et al. |
| 2010/0325267 A1 | 12/2010 | Mishra et al. |
| 2012/0009896 A1 | 1/2012 | Bandyopadhyay et al. |
| 2012/0309320 A1* | 12/2012 | Thyagarajan ......... H04L 41/142 455/67.11 |
| 2013/0109336 A1 | 5/2013 | Jackson et al. |
| 2013/0143561 A1* | 6/2013 | Nuss ..................... H04W 24/02 455/436 |
| 2013/0166730 A1 | 6/2013 | Wilkinson |
| 2013/0316701 A1 | 11/2013 | Xu et al. |
| 2014/0086073 A1 | 3/2014 | Baykal et al. |
| 2014/0087716 A1* | 3/2014 | Vaderna ................. H04L 43/50 455/422.1 |
| 2014/0099970 A1 | 4/2014 | Siomina et al. |
| 2014/0113656 A1 | 4/2014 | Schmidt et al. |
| 2014/0119196 A1 | 5/2014 | Hui et al. |
| 2014/0130111 A1 | 5/2014 | Nulty et al. |
| 2014/0160941 A1 | 6/2014 | Hui et al. |
| 2014/0229614 A1 | 8/2014 | Aggarwal et al. |
| 2014/0337871 A1* | 11/2014 | Garcia De Blas ......................... H04N 21/64738 725/14 |
| 2015/0163047 A1 | 6/2015 | Zhang |
| 2015/0326447 A1 | 11/2015 | Yoon et al. |
| 2015/0373565 A1 | 12/2015 | Safavi |
| 2016/0065419 A1 | 3/2016 | Szilagyi et al. |
| 2016/0112894 A1 | 4/2016 | Lau et al. |

OTHER PUBLICATIONS

PCT Search Report and Opinion dated Apr. 26, 2017 for PCT application No. PCT/US2016/067782, 12 pages.
PCT Search Report and Written Opinion dated Aug. 24, 2016 for PCT application No. PCT/US2016/033577, 11 pages.
Office Action for U.S. Appl. No. 14/803,769, dated Nov. 15, 2017, Yoon, "Quality of User Experience Analysis", 11 pages.
Office Action for U.S. Appl. No. 14/803,769, dated Feb. 9, 2018, Jong Sung Yoon, "Quality of User Experience Analysis", 10 pages.
Final Office Action for U.S. Appl. No. 14/183,300, dated Oct. 26, 2015, Jie Hui, "Quality of User Experience Analysis", 50 pages.
Final Office Action for U.S. Appl. No. 13/738,799, dated Dec. 26, 2014, Jie Hui, "Network Device Trace Correlation", 18 pages.
Office Action for U.S. Appl. No. 13/738,799, dated Jun. 17, 2015, Jie Hui, "Network Device Trace Correlation", 20 pages.
Office Action for U.S. Appl. No. 14/183,300, dated Jul. 13, 2015, Jie Hui, "Quality of User Experience Analysis", 42 pages.
Office Action for U.S. Appl. No. 13/738,799, dated Aug. 21, 2014, Jie Hui, "Network Device Trace Correlation", 15 pages.
PCT Search Report and Written Opinion dated Feb. 24, 2014 for PCT application No. PCT/US13/65984, 10 pages.
Office Action for U.S. Appl. No. 14/984,714, dated May 18, 2018, Lau et al, "Contextual Quality of User Experience Analysis Using Equipment Dynamics", 11 pages.
Office Action for U.S. Appl. No. 14/803,769, dated Jul. 6, 2018, Yoon, "Quality of User Experience Analysis", 12 pages.
Extended European Search Report dated Dec. 18, 2018 for European Patent Application No. 16803994.9, 7 pages.
Extended European Search Report dated Jan. 3, 2019 for European Patent Application No. 16803994.9, 7 pages.

* cited by examiner

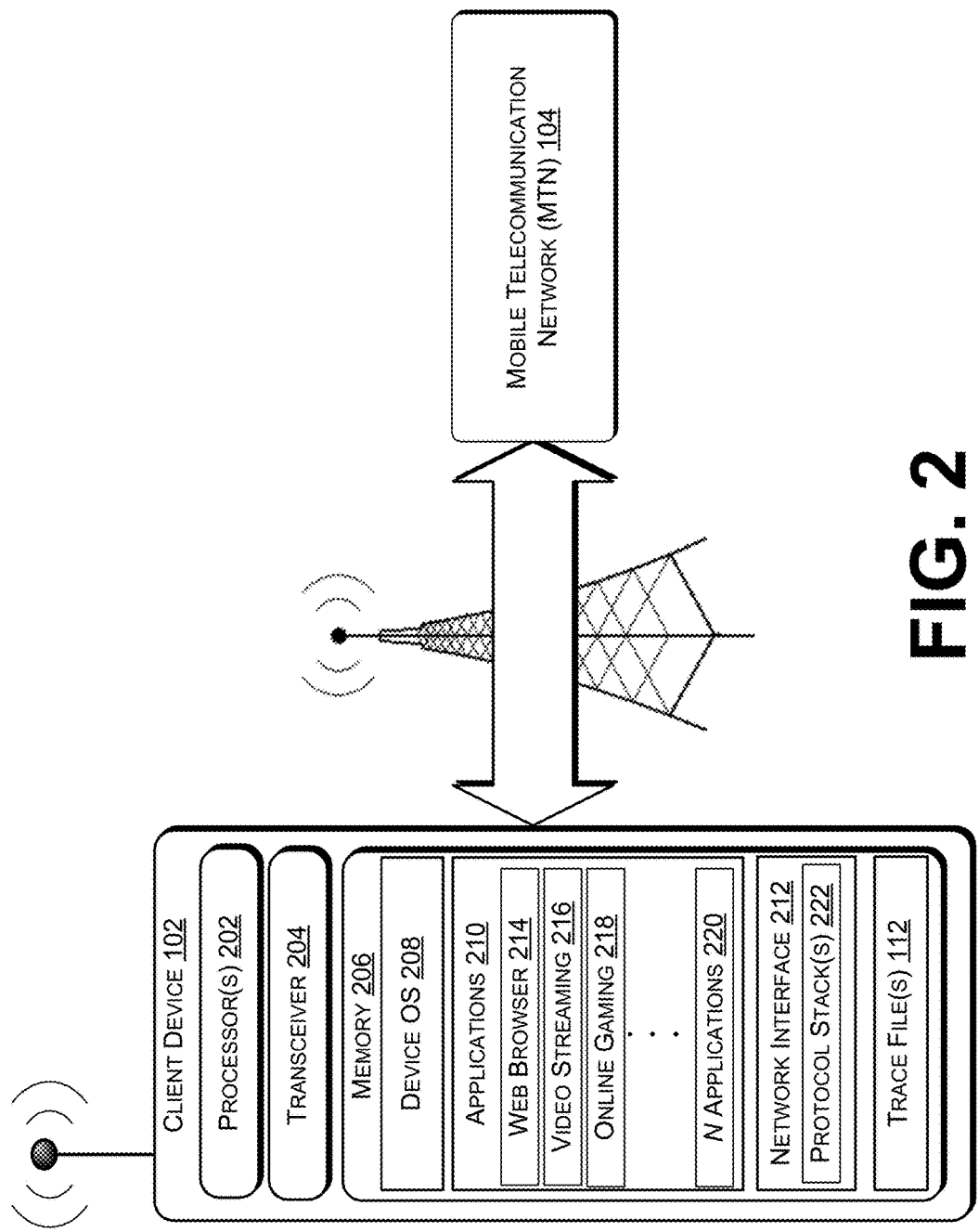

300 ↘

TRACE IDENTIFICATION (ID)
306

308 ↘

| NODE IDENTIFIER 310 ||
|---|---|
| TRACES 312 | TIMING INFORMATION 314 |
| TRACE ID 1 | TIMESTAMP 1 |
| TRACE ID 2 | TIMESTAMP 2 |
| TRACE ID 3 | TIMESTAMP 3 |
| TRACE ID 4 | TIMESTAMP 4 |
| TRACE ID 5 | TIMESTAMP 5 |
| TRACE ID N | TIMESTAMP N |

TEXTUAL REPRESENTATION 162

| Transition Info | Avg Time | Power | Message |
|---|---|---|---|
| PCH > FACH = 12 | 0.163 | Up | CU |
| FACH > DCH = 13 | 0.220 | Up | RBR |
| FACH > PCH = 14 | 0.007 | Down | CU/PCR |
| FACH > FACH = 1 | 0.176 | Even | CU |
| DCH > FACH = 14 | 1.113 | Down | RBR |

FIG. 17

QUALITY OF USER EXPERIENCE ANALYSIS

PRIORITY APPLICATION(S)

This patent application is a continuation of U.S. patent application Ser. No. 14/183,300, filed Feb. 18, 2014, which is a continuation-in-part of U.S. patent application Ser. No. 13/738,799, filed on Jan. 10, 2013, now U.S. Pat. No. 9,237,474 issued Jan. 12, 2016, which claims priority filing benefit from U.S. Provisional Patent Application No. 61/719,929, filed Oct. 29, 2012. Application Ser. Nos. 14/183,300, 13/738,799 and 61/719,929 and U.S. Pat. No. 9,237,474 are hereby incorporated by reference, in their entirety.

BACKGROUND

Modern telecommunication systems include heterogeneous mixtures of second, third, and fourth generation (2G, 3G, and 4G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies.

The infrastructure that makes up the modern telecommunications networks comprises multiple different components or devices (herein referred to as nodes) that are configured to generate, transmit, receive, relay, and/or route data packets so that data services can be requested by, and provided to, user equipment (UE) subscribed to a plan offered by one or more service providers or network communication providers that implement the telecommunications networks.

However, the data services and/or data communications provided via the nodes may often experience problems causing service degradation due to the vast amount of users and UEs accessing and requesting data via the telecommunications networks. For example, problems causing service degradation may be associated with data traffic congestion due to a high transfer demand for digital content (i.e., data transfer overload), and this may lead to data packet loss, packet queuing delay, an inability to establish a connection and other data communication and connection problems. These problems, if not addressed by a service provider or a network communication provider, degrade a network's Quality of Service (QoS) and an end user's Quality of User Experience (QoE) at the UE.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIG. 2 depicts example components of a client device configured to initiate data communications and log trace file entries in a trace file, in accordance with embodiments of the disclosure.

FIG. 17 is an example of a textual representation of performance metrics associated with communication engaged in by a device.

DETAILED DESCRIPTION

The techniques described herein present opportunities for service providers and/or network providers to optimize the QoE for data services by determining, using a broader network-based approach, the root cause of problems causing a service degradation (e.g., what problem is occurring, why the problem is occurring, where in the telecommunications network the problem is occurring). To determine the root cause of the problems, the techniques may collect different trace files from multiple different nodes in the telecommunications network (or from a communication interface between two nodes in the telecommunications network) or from multiple or single layers of a communication protocol stack of one of the devices. Each trace file includes a log of identifications for numerous different data packets that have been generated, received, transmitted, relayed, and/or routed via the node in the telecommunications network, and each trace file log entry may be associated with a timestamp. Once collected, the techniques may correlate the different trace files from the multiple different nodes to identify, using a broader network-based analysis, service optimization opportunities. Also or instead, the techniques may correlate data from different layers of a communication protocol stack of one of the devices, or may simply determine performance metrics for data from a specific layer of a specific device. For example, after correlating the trace files and determining that QoE has experienced a certain level of degradation, the techniques may provide an alert notification and a recommendation for optimization so that remedial actions may be implemented to address the root cause of the problems.

In various embodiments, the techniques provide the alert notification and recommendation to a network administrator when the trace file correlation and analysis determines that a key performance indicator (KPI) is not satisfying a minimum service level or service goal associated with QoE. The network administrator may then initiate the remedial actions. In alternative embodiments, the collection of the trace files, the correlation and analysis of the traces files and the implementation of the remedial actions may be performed automatically via a preset network configuration when service levels or service goals are not being satisfied.

Figure 1A:
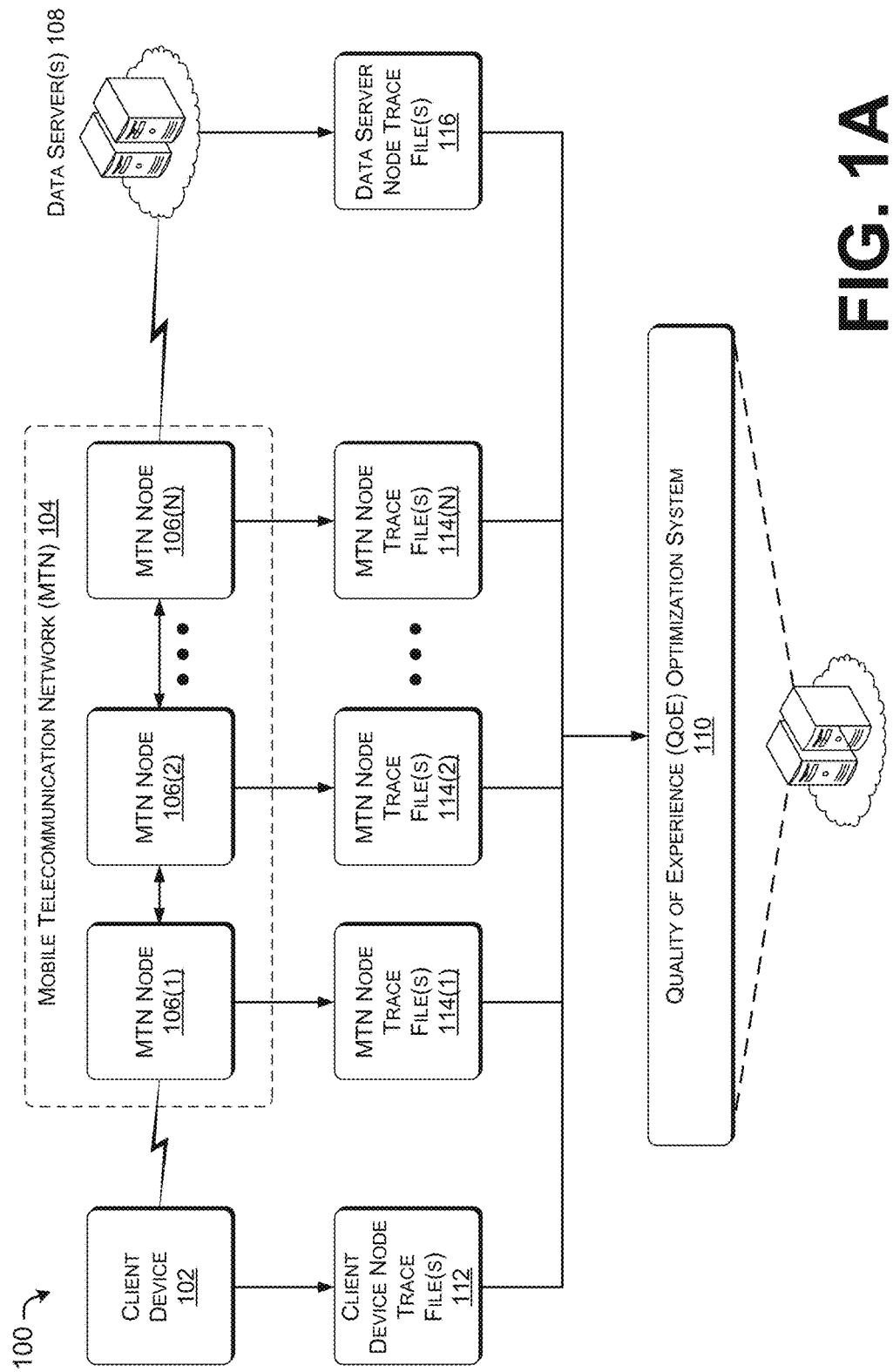
FIG. 1A depicts an example environment where trace files can be collected from a plurality of nodes and correlated to identify network optimization opportunities, in accordance with embodiments of the disclosure.

FIG. 1A depicts an illustrative environment 100 for collecting multiple trace files from different nodes that exchange data packets using a telecommunications network. To this end, the environment 100 may include a client device 102 (considered as a node herein), a mobile telecommunications network (MTN) 104 that includes multiple MTN nodes 106(1) . . . 106(N), one or more data servers 108, and a Quality of Experience (QoE) optimization system 110. Moreover, the environment 100 illustrates trace files that are logged at each node. For example, the client device 102 is associated with one or more client device node trace files 112, and the MTN nodes 106(1) . . . 106(N) are each associated with one or more MTN node trace files 114(1) . . . 114(N). In various embodiments, the data servers 108 may each be associated with one or more data server node trace files 116.

The client device 102 may also be referred to as a UE, as mentioned above. Thus, client devices 102 may include, but are not limited to, smart phones, mobile phones, cell phones, tablet computers, portable computers, laptop computer, personal digital assistants (PDAs), an electronic book device, a handheld gaming unit, a personal media player device, or any other portable electronic device that may generate voice and/or digital data, request voice and/or digital data over the MTN 104, receive voice and/or digital data over the MTN 104, and/or exchange voice and/or digital data over the MTN 104.

The MTN 104 may be configured to implement one or more of the second, third, and fourth generation (2G, 3G, and 4G) cellular-wireless access technologies discussed above. Thus, the MTN 104 may implement GSM, UMTS, and/or LTE/LTE Advanced telecommunications technologies. Different types of MTN nodes 106(1) . . . 106(N) in the GSM, UMTS, LTE, LTE Advanced, and/or HSPA+ telecommunications technologies may include, but are not limited to, a combination of: base transceiver stations BTSs (e.g., NodeBs, Enhanced-NodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), or any other data traffic control entity configured to communicate and/or route data packets between the client device 102 and the data servers 108. The MTN nodes 106(1) . . . 106(N) may be configured with hardware and software that generates and/or logs an entry in the MTN node trace files 114(1) . . . 114(N). While FIG. 1A illustrates an MTN 104, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

In various embodiments, each trace entry includes an identification associated with a data packet that is communicated through an interface for the MTN nodes 106(1) . . . 106(N) or associated with a data packet routed by the MTN nodes 106(1) . . . 106(N), as further discussed herein. In various embodiments, some of the MTN nodes 106(1) . . . 106(N) may be part of a core network (e.g., backhaul portion, carrier Ethernet) that is configured to access an IP-based network that provides data communications services (e.g., so that clients can access information at data servers 108). The data servers 108 may be owned and/or operated by web-based content providers, including, but not limited to: Bing®, Facebook®, Twitter®, Netflix®, Hulu®, YouTube®, Pandora®, iTunes®, Google Play®, Amazon Store®, CNN®, ESPN®, and the like.

In various embodiments, the MTN 104 may be configured to exchange data packets between the client device 102 and the data servers 108 using wired and/or wireless links. Moreover, the MTN 104 may be configured to determine a communications path or "pipe" so that the data packets can be routed and exchanged accordingly.

The data services and data access applications discussed in this document may include, but are not limited to, web browsing, video streaming, video conferencing, network gaming, social media applications, or any application or setting on the client device 102 that is configured to generate and exchange data with data servers 108 over the MTN 104.

In various embodiments, the QoE optimization system 110 may be configured to monitor and determine whether KPIs for the different data services are being satisfied or not satisfied in association with a particular service level or service goal (e.g., a threshold or model), which may affect the QoE. Examples of KPIs for web browsing, as well as other applications executing on the client device 102, may include webpage loading time, Domain Name System (DNS) lookup time, Transmission Control Protocol (TCP) connect time, TCP round trip time (RTT), Hypertext Transfer Protocol (HTTP) response time, and so forth. Examples of KPIs for video streaming and video conferencing, as well as other applications executing on the client device 102, may include application start delays, catalog browsing, searching delay, video start delay, fast forward and rewind delay, a number of buffering events, duration per buffering event, rebuffering ratio, a video frame rate, and so forth. Other KPIs for a UE may include application layer KPIs (such as average/minimum/maximum bit rate, traffic burstiness, amount of data bytes transferred), transport layer KPIs (such as transmission control protocol (TCP) retransmissions and TCP resets), radio layer KPIs (such as radio link control (RLC) retransmissions and RLC round trip time (RTT)), and physical layer KPIs (such as physical retransmissions, physical RTT, physical uplink (UL) interference, UE power, RACH time). The KPIs provided above are presented as examples, and thus, the list is not exhaustive. Rather, service providers and/or network providers may contemplate a large number of different KPIs which aid in gauging the QoE associated with the data services provided.

Figure 1B:
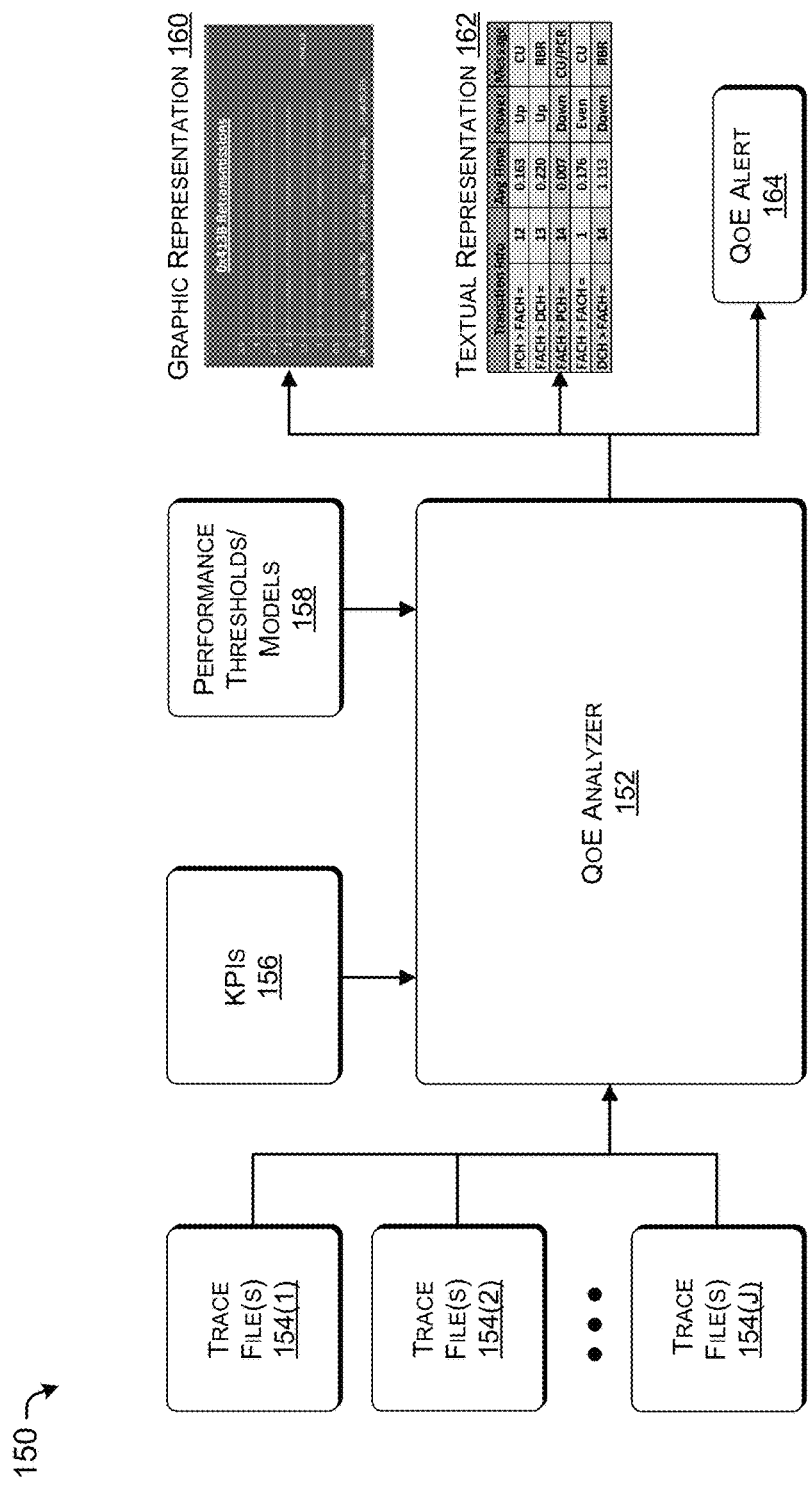
FIG. 1B depicts an example of part of an architecture of a QoE optimization system, in accordance with embodiments of the disclosure.

FIG. 1B depicts an example of part of an architecture 150 of a QoE optimization system 110, in accordance with embodiments of the disclosure. As illustrated, a QoE analyzer 152 of the architecture 150 may receive trace file(s) 154(1), 154(2) . . . 154(J). The QoE analyzer 152 may determinate performance metrics associated with KPIs 156 for data from all or a subset of the trace file(s) 154(1), 154(2), . . . 154(J). The QoE analyzer 152 may also correlate the data from the trace file(s) 154(1), 154(2) . . . 154(J) and analyze the correlated data based on performance thresholds or performance models 158 to determine whether communication represented by the trace file(s) 154(1), 154(2) . . . 154(J) exhibits a degraded QoE. The performance metrics or correlated data produced by the QoE analyzer 152 may then be used to generate one or more graphic representations 160 and/or one or more textual representations 162. Alternatively or additionally, an alert 164 may be provided when the QoE analyzer 152 determines that the communication represented by the trace file(s) 154(1), 154(2) . . . 154(J) exhibits a degraded QoE.

In various embodiments, the trace file(s) 154(1), 154 (2) . . . 154(J) may be trace files from a single node (e.g., trace files 112, 114, or 116) or may be trace files from multiple nodes (e.g., multiple ones of trace files 112, 114, or 116). Each trace file 154 may include data from a single layer of a communication protocol stack (e.g., communication protocol stack 222) of a device (e.g., one of the client device 102, MTN node 106, or data server 108) or from multiple layers of such a device. For example, trace files 154 may include transmission control protocol (TCP) logs, packet capture (PCAP) logs, Qualcomm eXtensible Diagnostic Module (QXDM) logs, application logs (e.g., LogCat logs), etc. The data included in the trace file 154 may be associated with any sort of communication such as a wireless communication, a wireless packet-based communication, etc. Examples of such communications are described further herein.

Data may be extracted from the trace files by an automated log parser tool, which may be associated, for example, with a trace file receiving module 410. The trace files 154 and/or the data extracted may then be stored in a trace file database 412 of the QoE optimization system 110. In some embodiments, the trace file receiving module 410 or another module of the QoE optimization system 110 may then provide the data extracted from the trace files 154 and/or the trace files 154 themselves to the QoE analyzer 152.

The QoE analyzer 152 may be implemented by one or more modules of the QoE optimization system 110, such as the trace file correlation module 414, the cross file analysis module 416, and the trace sorting module 422. In some embodiments, the QoE analyzer 152 may retrieve data associated with a single layer (e.g., the radio layer) which was included in the trace file 154 of a single device. Such data may be retrieved, for instance, from a trace file database 412 or may be provided to the QoE analyzer 152 by the trace file receiving module 410.

The QoE analyzer 152 may then determine performance metrics associated with KPIs for the received/retrieved data. When the received/retrieved data is associated with the radio layer, the QoE analyzer 152 may determine performance metrics associated with radio layer KPIs, such as RLC retransmissions, packet loss, network signaling, radio resource control (RRC) state duration, radio state transition times, times spent in different radio states, number of radio state transitions, or reconfiguration response times. When the received/retrieved data is associated with a network, transport, or Internet layer, the QoE analyzer 152 may determine performance metrics associated with KPIs such as domain name service (DNS) RTT, TCP RTT, hypertext transfer protocol (HTTP) RTT, TCP retransmissions, TCP duplicate acknowledgements, TCP resets, TCP failures, delta frames, or sequence numbers. The QoE analyzer 152 may then provide the determined performance metrics and indication of their associated KPIs to another module of the QoE optimization system 110, such as the presentation and notification module 424. That other module may then generate one or both of a graphic representation 160 for some or all of the performance metrics or a textual representation 162 for some or all of the performance metrics.

Figure 12:
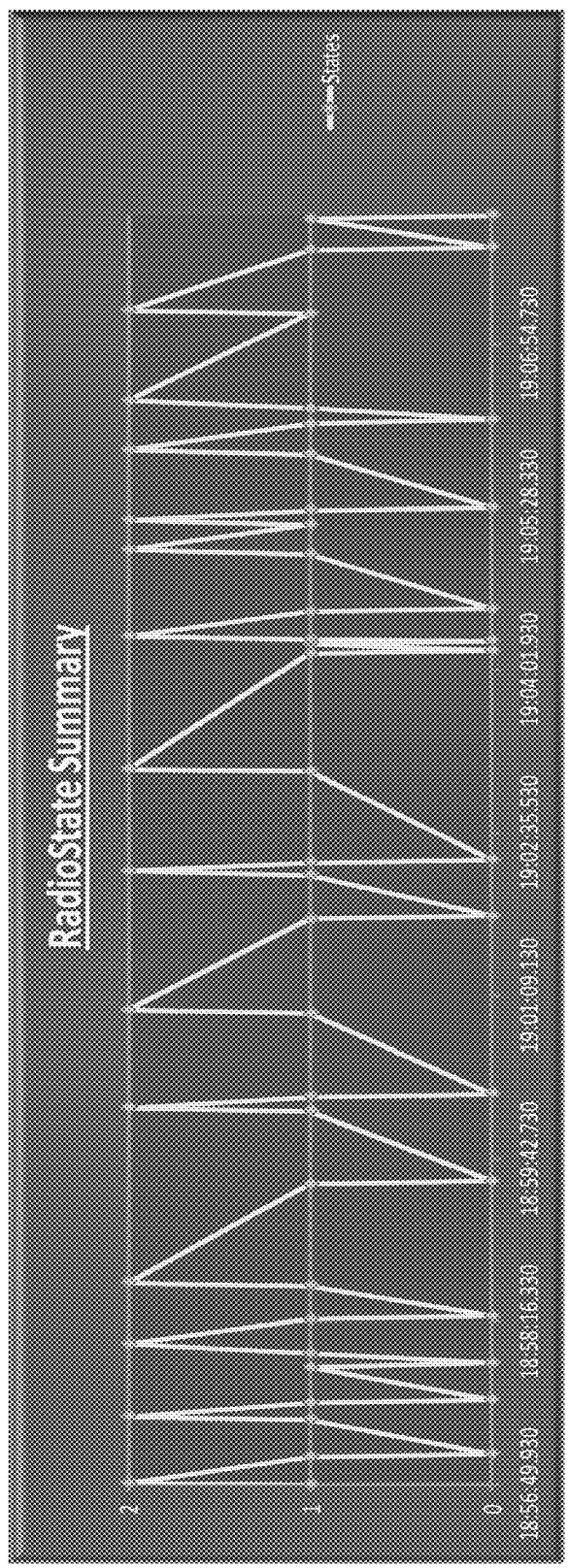
FIG. 12 is an example of a graphic representation of performance metrics associated with communication engaged in by a device.
Figure 13:
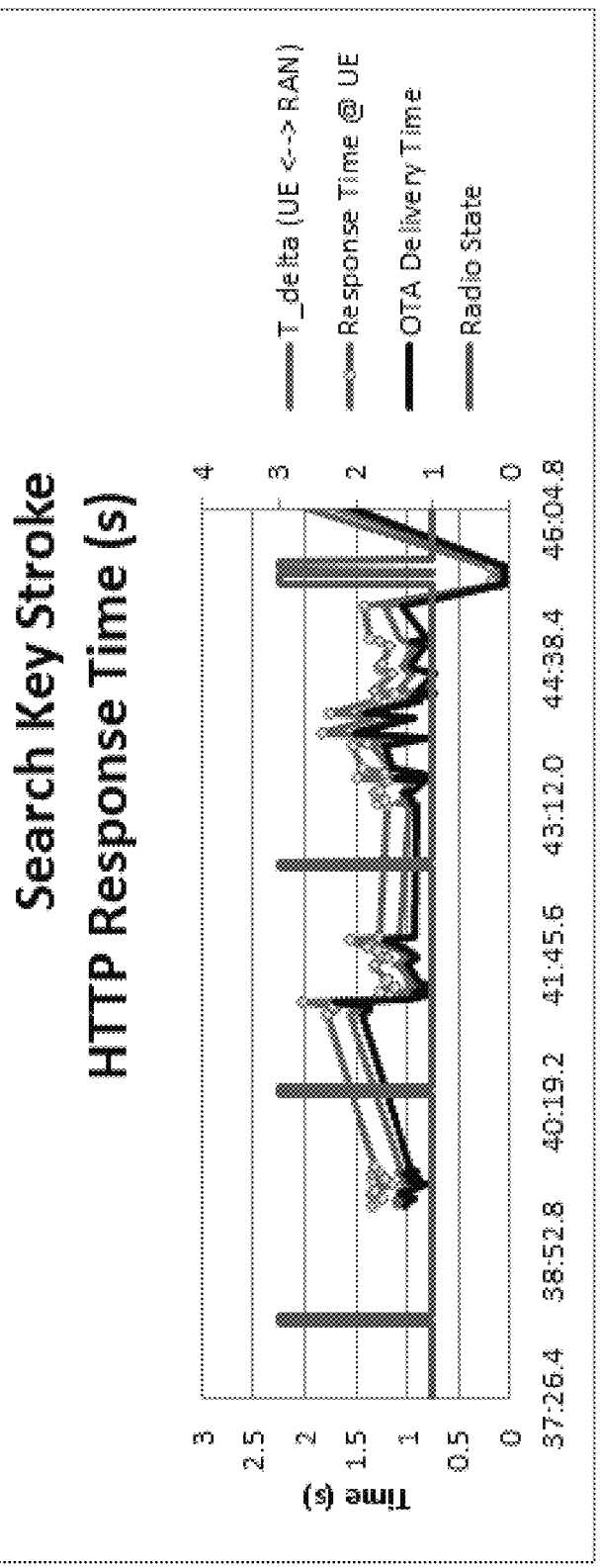
FIG. 13 is an example of a graphic representation of performance metrics associated with communication engaged in by a device.
Figure 14:
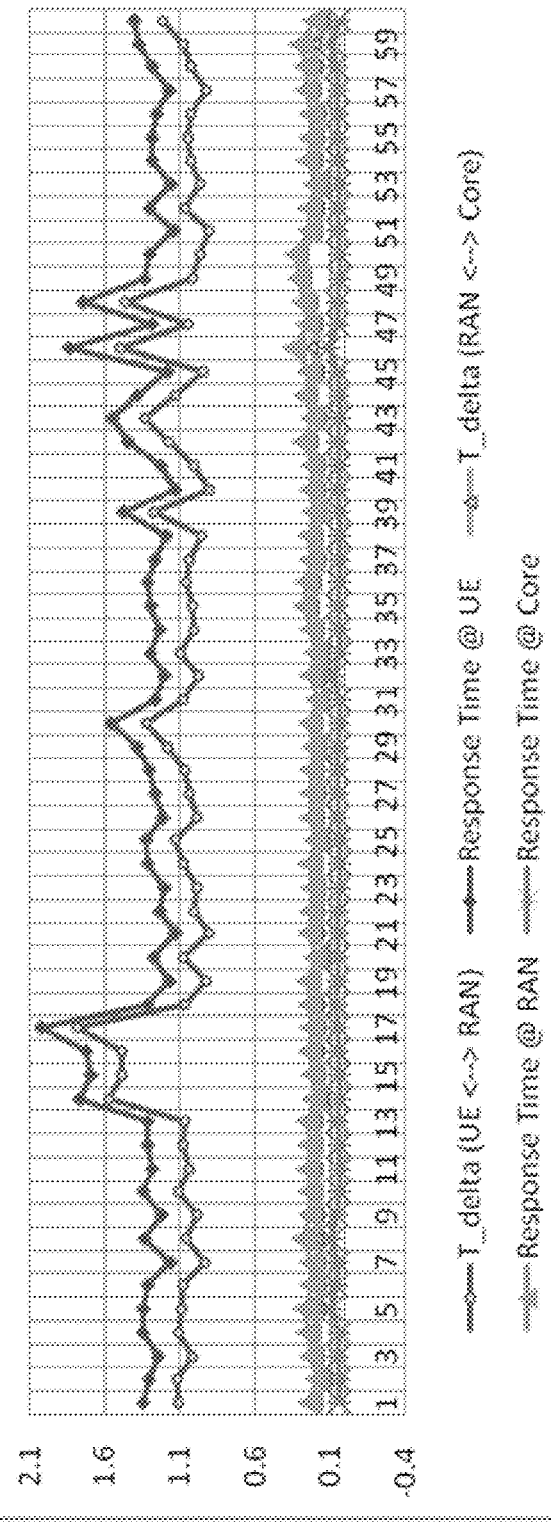
FIG. 14 is an example of a graphic representation of performance metrics associated with communication engaged in by a device.
Figure 15:
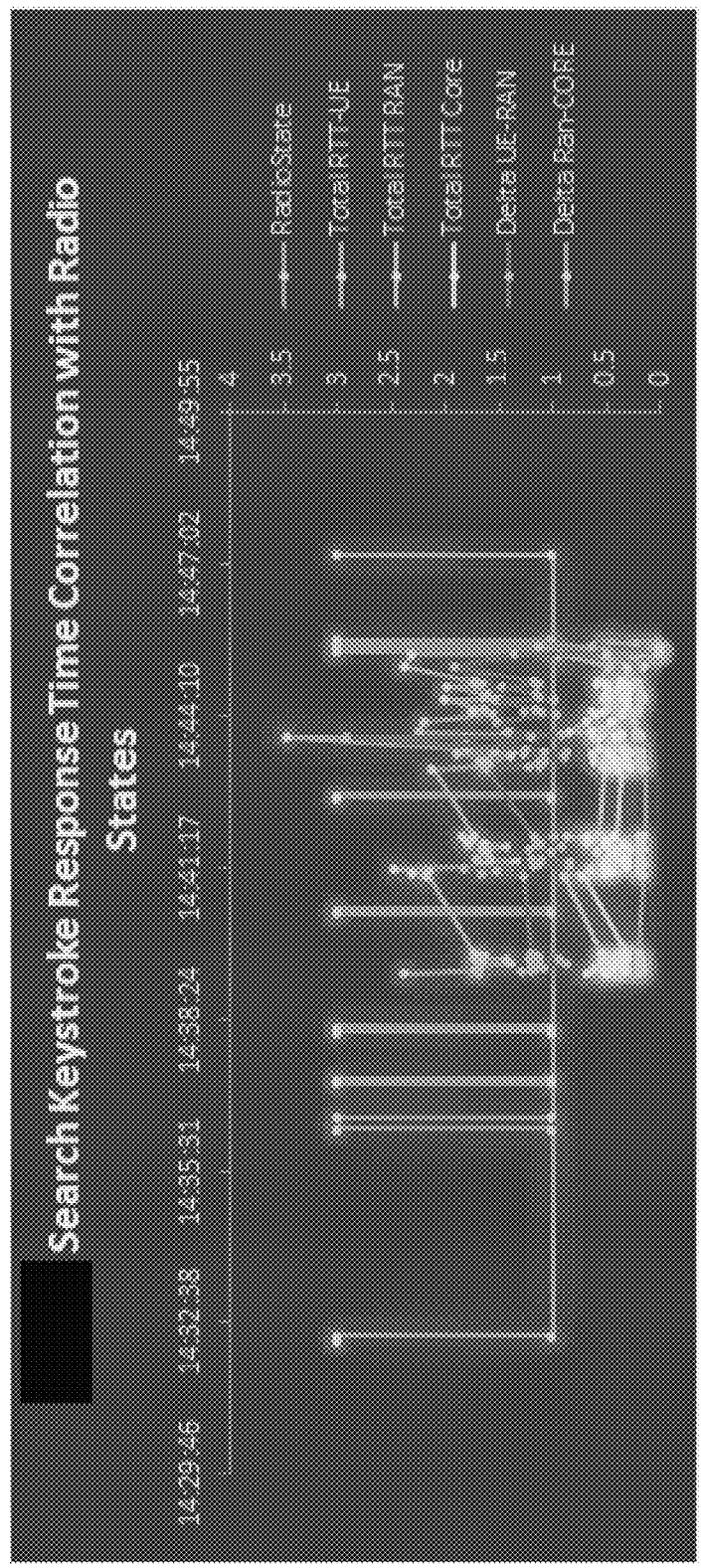
FIG. 15 is an example of a graphic representation of performance metrics associated with communication engaged in by a device.
Figure 16:
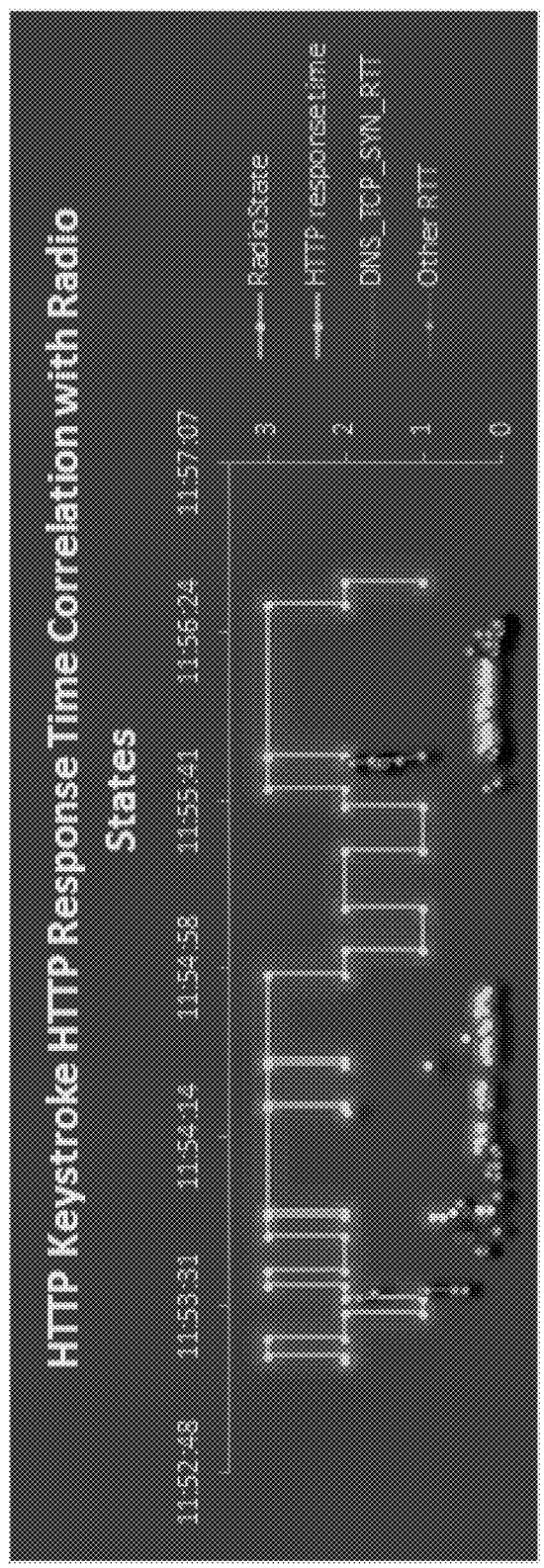
FIG. 16 is an example of a graphic representation of performance metrics associated with communication engaged in by a device.

FIGS. 12-16 are examples of graphic representations 160 of the performance metrics determined by the QoE analyzer 152. In FIG. 12, the graphic representation 160 is a radio state summary diagram. In FIG. 13, the graphic representation 160 is a graph of search keystroke HTTP response time(s). In FIG. 14, the graphic representation 160 is a graph of components of search keystroke HTTP response time(s). In FIG. 15, the graphic representation 160 is a graph of the correlation of search keystroke response times with radio states. In FIG. 16, the graphic representation 160 is a graph of the correlation of HTTP keystroke HTTP response times with radio states. Any number of other charts and diagrams for performance metrics or correlated data associated with KPIs 156 may also or instead be generated.

FIG. 17 is an example of a textual representation 162 of performance metrics determined by the QoE analyzer 152. In FIG. 17, the textual representation 162 is a radio state transition log. Any number of other textual or log representations for performance metrics or correlated data associated with KPIs 156 may also or instead be generated.

Returning to FIG. 1B, the QoE Analyzer 152 may also or instead retrieve data associated with multiple layers (e.g., the radio layer and the network layer) which was included in one or more trace files 154 of a single device. Such data may be retrieved, for instance, from a trace file database 412 or may be provided to the QoE analyzer 152 by the trace file receiving module 410. The QoE Analyzer 152 may then correlate received/retrieved data from different ones of the layers with each other. The data being correlated may, for instance, represent a data packet. The QoE Analyzer 152 may correlate data from a first layer which represents the data packet with data from a second layer which represents the data packet. In some embodiments, the QoE Analyzer 152 may correlate the data based on the representations of the IP payload of the data packet in the first and second layers. As mentioned above, the correlation by the QoE Analyzer 152 may be implemented by a module of the QoE optimization system 110, such as the trace file correlation module 414. Correlation between layers is described below in further detail with reference to FIG. 6.

In some embodiments, the QoE Analyzer 152 may also or instead retrieve data from multiple trace files 154 of multiple devices. Such data may be retrieved, for instance, from a trace file database 412 or may be provided to the QoE analyzer 152 by the trace file receiving module 410. The QoE Analyzer 152 may then correlate the data. The data may be correlated based on trace identifications (trace ID). Each device may use the same trace ID for the same data packet, request/response pair, or communication session. The correlation between trace files 154 of multiple devices by the QoE Analyzer 152 may be implemented by a module of the QoE optimization system 110, such as the trace file correlation module 414. This correlation is described further herein in greater detail.

In various embodiments, the QoE Analyzer 152 may then analyze the correlated data based on either or both of performance threshold or models 158. The performance thresholds or models 158 may be static or learned. For example, the performance threshold or models 158 may represent the typical communication of a data packet, a request/response, or a session. When the correlated data does not match or is outside of a tolerance threshold from the performance threshold or models 158, the QoE Analyzer 152 may determine that the communication represented by the correlated data exhibits a reduced QoE. This analysis of correlated data may be implemented by a module of the QoE optimization system 110, such as the cross file analysis module 416. This analysis is described further herein in greater detail.

When the QoE Analyzer 152 determines that the communication represented by the correlated data exhibits a reduced QoE, a module of the QoE optimization system 110 may provide an alert 164 of the reduced QoE. The presentation and notification module 424 may be an example of such a module and may provide alerts of reduced QoE responsive to determination of the reduced QoE by the QoE analyzer 152.

Additionally or alternatively, the module of the QoE optimization system 110, such as the presentation and notification module 424, may generate a graphic representation 160 or textual representation 162 for the correlated data.

FIG. 2 illustrates example components of the client device 102, which is configured to wirelessly transmit a request for data to the MTN 104 or receive data from the data servers 108 over the MTN 104. Thus, the client device 102 may include one or more processor(s) 202, a radio transceiver 204 for wirelessly communicating with the MTN 104, and a memory 206 storing a device operating system (OS) 208, various software applications 210 configured to request/receive data over the MTN 104, a network interface module 212, and the client device node trace files 112.

In various embodiments, the applications 210 stored at the client device 102 may include, but are not limited, a web browser application 214, a video streaming application 216, an online gaming application 218, and so on, through an Nth software application 220. During execution on the client device 102, each of the applications 210 may be configured to cause the client device 102 to initiate data communications with the data servers 108 over the MTN 104.

The client device 102 may be configured to communicate over a telecommunications network using any common wireless and/or wired network access technology. Moreover, the client device 102 may be configured to run any compatible device OS, including but not limited to, Microsoft Windows Mobile®, Google Android®, Apple iOS®, Linux Mobile®, as well as any other common mobile device OS.

Each of the one or more processor(s) 202, can include one or more central processing units (CPUs) having multiple arithmetic logic units (ALUs) that perform arithmetic and logical operations, as well as one or more control units (CUs) that extract instructions and stored content from processor cache-level memory, and then executes instructions by calling on the ALUs during program execution. In an implementation, the processor(s) 202 may be configured to execute each of the software applications 210 stored in the memory 206. In various embodiments, the network interface module 212 may be configured to detect an action (e.g., operation, command, user input) directed to one of the applications 210, the action triggering the generation of a data transfer request and a transmission of the data transfer request.

The memory 206 may be implemented using computer readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism.

In various embodiments, the client device node trace files 112 may correspond to individual ones of multiple layers of a communication protocol stack 222 associated with the network interface module 212 of the client device 102. For example, the multiple layers of the communication protocol stack 222 may correspond to the Open Systems Interconnection (OSI) model characterizing and standardizing functions of a communications system in terms of abstraction layers. The multiple layers may also correspond to the Internet Protocol (IP) suite. For example, in various embodiments, the client device 102 may log a single client device node trace file 112 for each of a physical layer, a data link/radio layer, a network layer/Internet layer, a transport layer, a session layer, a presentation layer, and an application layer, as a data packet is generated and configured amongst the layers for communication from the client device 102 to the data servers 108 over the MTN 104.

Moreover, the client device 102 may log a single client device node trace file 112 for a particular set of the layers of the communication protocol stack 212. For example, the client device 102 may log a first client device node trace file 112 for the application/presentation/session layers, a second client device node trace file 112 for the transport/network layers, a third client device node trace file 112 for the data link layer, and a fourth client device node trace file 112 for the physical layer. By logging trace files at the layer level of the client device 102, the QoE optimization system 110 may be able to determine the root cause of problems at a more granular level after collecting the trace files at the layer level (as compared to the node level). This may further help when identifying remedial actions that optimize the QoE.

Similar to the multiple different layers at the client device 102, each of the MTN nodes 106(1) . . . 106(N), as well as each of the data servers 108, may also log different trace files (e.g., 114(1) . . . 114(N) and 116) for individual layers, or defined combination(s) of layers of the communication protocol stack of that MTN node 106/data server 108. Accordingly, the QoE optimization system 110 may also identify the root cause of problems at a more granular level at the MTN nodes 106(1) . . . 106(N) and the data servers 108.

Figures 3A, 3B:
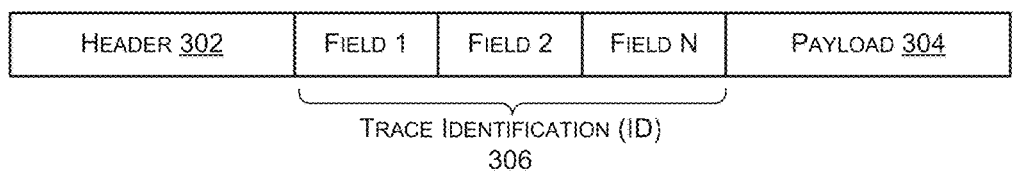
FIG. 3A depicts an example data packet that may be logged in a trace file, in accordance with embodiments of the disclosure.
FIG. 3B depicts an example trace file, in accordance with embodiments of the disclosure.

FIG. 3A depicts an example data packet 300 configured to be logged in one of the client device node trace files 112, the MTN node trace files 114(1) . . . 114(N), or the data server node trace files 116. The data packet 300 may be configured in association with one or more communication or data exchange/formatting protocols such as TCP, IP, HTTP or other protocols directed to communicating or exchanging content over the MTN 104.

In various embodiments, the data packet 300 may include a header portion 302 and a payload portion 304. The data packet may further include a portion including N fields, at least a portion of which are used to create a trace ID 306 for the data packet. In various embodiments, the fields used to create the trace ID 306 may be part of the header portion 302, the payload portion 304, or a combination thereof.

In various embodiments, one or more of the N fields may be associated with routing and addressing information commonly included in the data packet, or one or more fields that may be defined and are unique to a particular protocol. For example, a field may include a Packet Data Protocol (PDP) address, a source port number, a destination port number, a checksum number (for IPv4 or IPv6), a sequence number, an acknowledgement number, an Internet Protocol (IP) address, a source address, a destination address or any other field in the data packet that may help distinguish one data packet from another. Moreover, a field may also help identify a request/response sequence or pair, or a particular communication session established, such that data packets can be matched and/or correlated correctly, even though the trace ID 306 as a whole may not be an exact match.

Accordingly, the trace ID 306 may be comprised of a single field, or a combination of two fields, three fields, four fields, and so forth. The more fields used to comprise the trace ID 306 may help ensure that the trace ID 306 is unique for the data packet or correlates related data packets, so that the data packets can be tracked through their communication paths. In at least one embodiment, the trace ID 306 includes four fields: a PDP address, a checksum number, a source port number, and a destination port number.

FIG. 3B depicts an example trace file 308 that may correspond to the client device node trace files 112 logged at the client device, the MTN node trace files 114(1) . . . 114(N) logged at the MTN nodes 106(1) . . . 106(N), or the data server node trace files 116 logged at the data servers 108. The trace file 308 may include a node identifier 310 that the QoE optimization system 110 may use so that it knows what node (e.g., the client device 102, one of the MTN nodes 106(1) . . . 106(N), or a data server 108) the trace file is associated with after the QoE optimization system 110 collects the trace files. Thus, the QoE optimization system 110 will be able to identify the node or nodes where the root cause of the problems is occurring and then implement remedial actions accordingly.

In various embodiments, the trace file 308 is configured to log entries for the data packets communicated via a node or node interface, e.g., the traces column 312 (e.g., the trace IDs 306 in the traces column 312 may correspond to multiple different client devices using the node to communicate). Moreover, the trace file 308 is configured to receive timing information 314 in the form of a timestamp for each entry, and associate/store the timestamp with the entry, as shown. Accordingly, the trace file 308 may sequentially log a list of numerous data packet IDs and timestamps associated with when the data packets were received, transmitted, routed, and so forth.

At each node, the timestamps are logged via use of a time source (e.g., a local time source or a remote time source). In one embodiment, the time source may be common for the nodes, or at least some of the nodes. In an alternative, the time source may be different for each node, or at least some of the nodes. Thus, the timing information 314 merged together (from multiple trace files) may be approximated merged timing information because some nodes may use different time sources that may not be synchronized.

Figure 4:
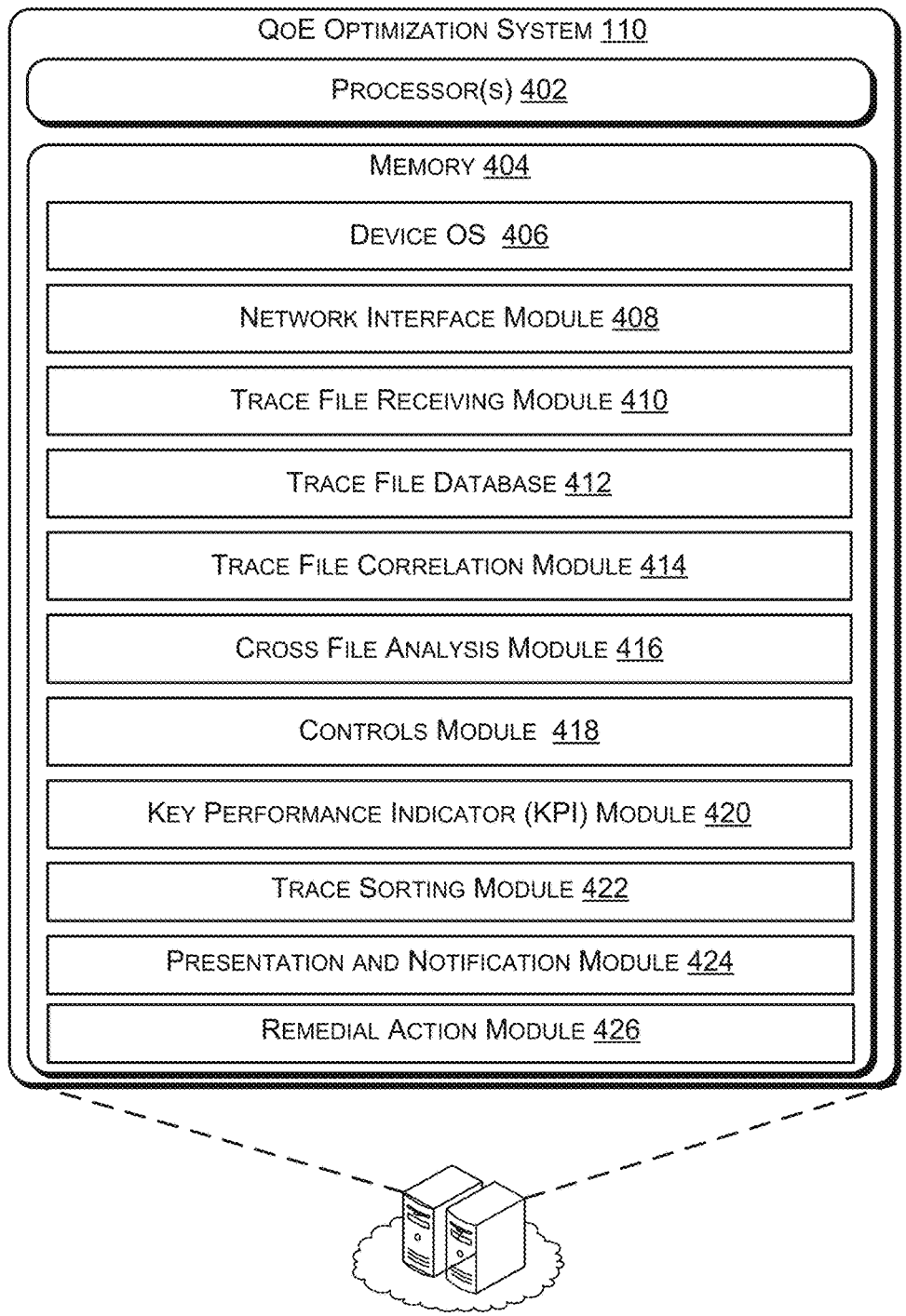
FIG. 4 depicts example components of a device configured to collect and correlate the trace files, as well as perform network analysis, in accordance with embodiments of the disclosure.

FIG. 4 illustrates example components of the QoE optimization system 110. In various embodiments, the QoE optimization system 110 may be a service provider entity or a telecommunications provider entity that may be part of one of the MTN nodes 106(1) . . . 106(N), or in communication with the MTN nodes 106(1) . . . 106(N) via a network connection. Moreover, in various embodiments, the QoE optimization system 110 may be a standalone application that is part of the client device 102 or a data server 108.

In various embodiments, the QoE optimization system 110 may be one or more server or computing devices that include one or more processor(s) 402 and memory 404 storing a device OS 406 and a network interface module 408 that enables the trace file receiving module 410 of the QoE optimization system 110 to communicate and receive the trace files from the nodes in FIG. 1A, and store the trace files or data retrieved from the trace files in the trace file database 412.

Each of the one or more processor(s) 402 of the QoE optimization system 110 may include one or more CPUs having multiple ALUs that perform arithmetic and logical operations, as well as one or more CUs that extract instructions and content from processor cache memory, and then executes the instructions by calling on the ALUs, as necessary, during program execution. The processor(s) 402 may further be configured to execute the modules stored in the memory 404.

The memory 404 may be implemented using computer readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism.

In various embodiments, the memory 404 may further store a trace file correlation module 414, a cross file analysis module 416, a controls module 418, a key performance indicator (KPI) module 420, a trace sorting module 422, a presentation and notification module 424, and a remedial action module 426.

The trace file correlation module 414, describe above with respect to the QoE analyzer 152, is configured to merge and/or otherwise correlate the client device node trace files 112, the MTN node trace files 114(1) . . . 114(N), and/or the data server node trace files 116. By merging and/or correlating the trace files, the trace file correlation module 414 matches trace IDs 306 from different nodes that may be associated with the same data packet. Accordingly, the trace ID 306 remains constant as the data packet is communicated and/or routed from the client device 102 to the one or more data servers 108 (e.g., uplink via a determined route/path in the MTN 104), or from the one or more data servers 108 to the client device 102 (e.g., downlink via a determined route/path in the MTN 104). In at least some embodiments, the trace file correlation module 414 may merge or otherwise correlate a subset of a total number of trace files collected.

In some embodiments, the trace file correlation module 414 is further configured to match corresponding request/response data packets that may not have the same trace ID 306, but may be paired by referencing one or more fields in the trace ID 306 that associates a response packet with a request packet (e.g., a sequential indicator conveying that response packet "2" is responsive to request packet "1"). In further embodiments, the trace file correlation module 414 may match a group of data packets communicated within an established communication session (e.g., a video stream), by referencing one or more fields in the trace ID 306 that associate the data packet with the communication session. One or more fields used by the trace file correlation module 414 to match a request packet and a response packet, or to match data packets communicated within an established communication session, may depend on a type of communication protocol used.

In various embodiments, once the trace file correlation module 414 merges or otherwise correlates the trace files and matches trace IDs 306 for a single data packet, for a request/response packet pair, or for data packets communicated within an established communication session, then the cross file analysis module 416 may use the correlation to perform network communications analysis and to determine the root cause of problems which may be leading to a degradation in QoE. In various embodiments, the cross file analysis module 416 may use the timing information 314 for the matched trace IDs 306 to perform the network communications analysis and to determine the root causes of problems that can be identified via timing issues. Example network communications analysis may relate to: packet delay, latency mapping, packet drop rate, congestion windows, packet loss, packet error rate, location of retransmission requests and a number of retransmission requests, etc. Moreover, results from the network communication analysis may identify one or more nodes along the communication path that are the root cause of the problems, and why the one or more nodes are the root cause of the problems. Therefore, the QoE optimization system 110 can identify opportunities to optimize the QoE by eliminating the problems, or part of the problems, via remedial actions.

In various embodiments, the cross file analysis module 416 may perform analysis across the multiple correlated trace files in accordance with instructions received from a controls module 418. The controls module 418 may receive a specific type of analysis to be performed from a network administrator. For example, the network administrator may input commands to the controls module 418 that identify one or more KPIs to be analyzed to ensure that a defined service level or service goal is or is not being satisfied. In various embodiments, the KPI module 420 defines the different KPIs, as listed above, for different applications 210 executing on the client device 102. Moreover, the KPI module 420 may also define particular service levels or service goals for the KPIs (such as, e.g., the performance thresholds or models 158), as defined by a service provider or a network telecommunications provider (e.g., by a network administrator acting as an agent for the service provider or the network telecommunications provider).

In some embodiments, the cross file analysis module 416 may perform analysis automatically. Thus, a network administrator may configure the trace file receiving module 410 of the QoE optimization system 110 to collect the different trace files so that they can be merged or otherwise correlated by the trace file correlation module 414 and the cross file analysis module 416 can perform some sort of analysis in a periodic manner (every hour, every day, every two days, and so forth). In various embodiments, this automatic analysis may be performed separately for individual KPIs or a particular combination of KPIs. In other embodiments, the automatic and periodic analysis may be performed for a particular application of the various applications 210 configured to be executed on the client device 102.

In various embodiments, the trace sorting module 422 may be employed by the cross file analysis module 416 to sort the trace IDs 306 that have been merged or otherwise correlated from the trace files collected. This sorting, or filtering, may aid in the analysis performed by the cross file analysis module 416. For example, the trace sorting module 422 may use one or more of the fields to sort the trace IDs so that data packets sent from or sent to a particular client device 102 are identified (e.g., a particular user or subscriber). The trace sorting module 422 may use the timestamps to sort the trace IDs 306 so that data packets in a particular timing window are identified. The trace sorting module 422 may use the trace sorting module 422 may use one or more of the fields to sort the trace IDs 306 so that data packets from a particular type of equipment (e.g., a model from a manufacturer) are identified. The trace sorting module 422 may use one or more of the fields to sort the trace IDs 306 so that data packets communicated for a particular application are identified. The trace sorting module 422 may use one or more of the fields to sort the trace IDs 306 so that data packets communicated to/from a particular source are identified (e.g., a data server 108).

In various embodiments, the QoE optimization system 110 employs the presentation and notification module 424 to format and present a notification or alert (e.g., via a graphical user interface), such as the alert 164, after the cross file analysis module 416 performs a network performance analysis. In one embodiment, a notification may state that networks communications are well and that one or more KPIs and service levels are being satisfied. Therefore, QoE is not currently degraded. In an alternative embodiment, an alert may report that network communications are causing degradation in QoE because one or more KPIs and a particular service level are not being satisfied. In this alternative embodiment, the presentation and notification module 424 may convey a location (e.g., one or more nodes) of the root cause of the problems and/or one or more reasons for the problems.

In some embodiments, the presentation and notification module 424 may also be configured to generate graphic representations 160 or textual representations 162, as is described in greater detail herein. Also, the presentation and notification module 424 may enable a user of the QoE optimization system 110 to initiate a test communication of data packets from one of the client device 102, MTN node 106, or data server 108 to another of the client device 102, MTN node 106, or data server 108. Data associated with that test communication will then be represented in some or all of the trace files 112-116 and available for collection and analysis.

In various embodiments, the remedial action module 426 may include instructions to remediate the network communication problems identified. Thus, the cross file analysis module and/or the presentation and notification module 424 may access the remedial action module to determine one or more suggested solutions to the problems, and then present the selected solutions via a graphical user interface so they may be implemented. In at least one embodiment, the remedial action module 426 is configured to implement the solutions automatically in response to the identification of the problems.

Figure 5:
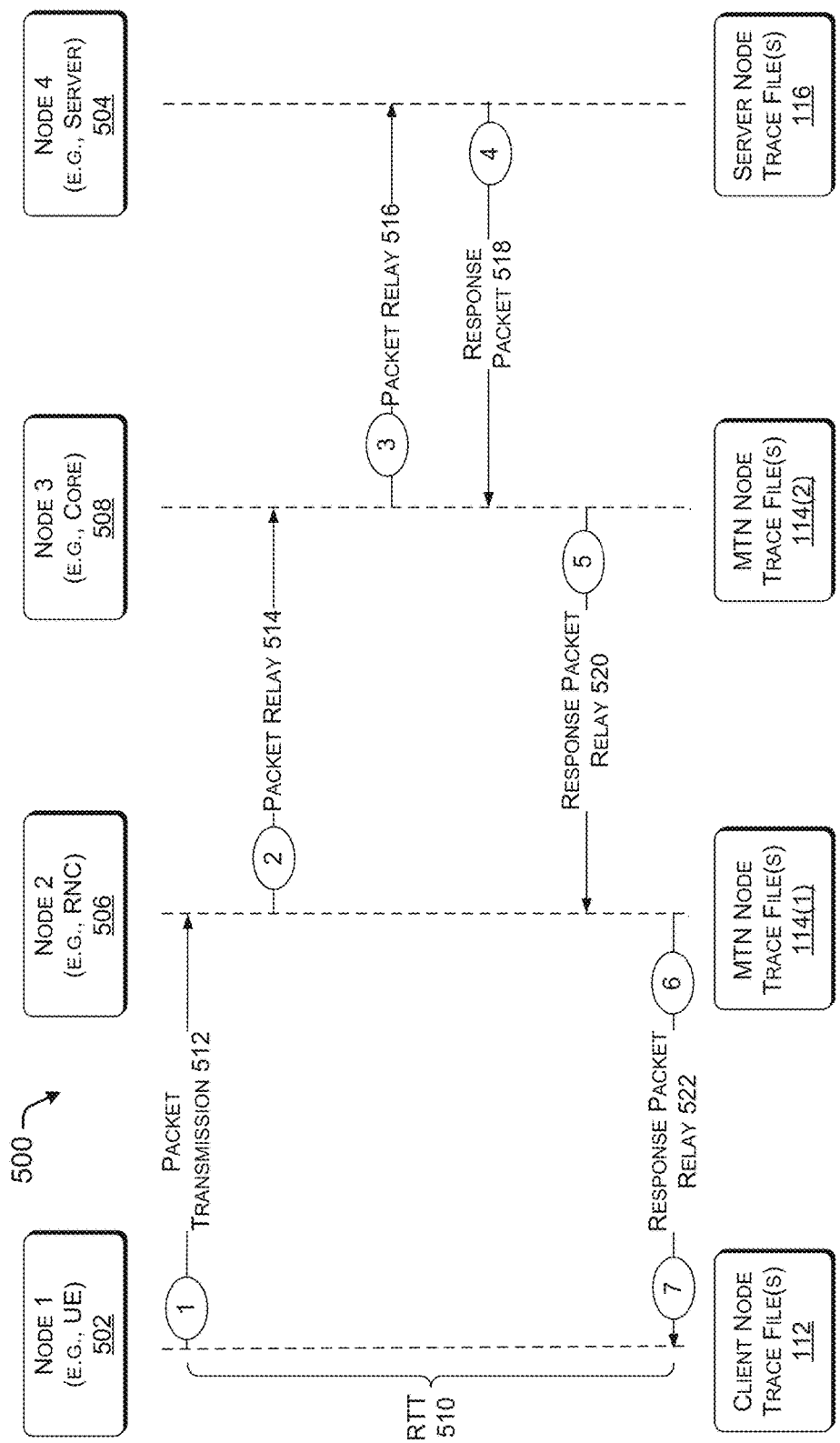
FIG. 5 is an example data packet communication diagram that is transmitted over a network and that represents horizontal correlation, in accordance with embodiments of the disclosure.

FIG. 5 illustrates an example timing diagram 500 of data packets being exchanged between a first node 502 (e.g., the client device 102 or UE) and a fourth node 504 (e.g., a data server 108), via a second node 506 (e.g., an RNC) and third node 508 (e.g., a core network node) that may be part of the MTN 104. This example is provided to show how the QoE optimization system 110 may identify network communication problems using the timing information 314 in the trace files 308. Accordingly, the first node 502 logs trace entries in the client node trace files 112, the second node 506 logs trace entries in MTN node trace files 114(1), the third node 508 logs trace entries in MTN node trace files 114(2), and the fourth node logs trace entries in server node trace files 116. While four nodes are depicted in FIG. 5, it is understood in the context of this document that additional nodes may be involved in the exchange of data packets between a client device 102 and a data server 108, particularly additional nodes within the MTN 104. The example timing diagram 500 in FIG. 5 represents a horizontal correlation of packets communicated across multiple nodes of a network. Horizontal correlation may use horizontal unique trace IDs based on packet header information to correlate the packets across the multiple nodes. In contrast, vertical correlation refers to packets as they are communicated amongst multiple different layers (e.g., OSI model layers or stacks) at a single node, as further discussed with respect to FIG. 6. Vertical correlation may use a vertical unique trace ID based on IP payloads to correlate the packets as they are communicated through the layers.

FIG. 5 illustrates an initial data packet being sent from the first node 502 to the fourth node 504 (e.g., via an uplink), and a response data packet being sent from the fourth node 504 to the first node 502 (e.g., via a downlink). Accordingly, FIG. 5 shows a RTT 510 at the first node 502 that represents a time between the transmission of the initial data packet and the reception of the response data packet.

As illustrated in FIG. 5, the initial data packet is generated at the first node 502 and transmitted 512 to the second node 506. Thus, the first node 502 may log an entry for the data packet in the client node trace files 112 with a timestamp (e.g., labeled "1" in FIG. 5). The second node 506 receives the initial data packet, may access, change and/or add routing information, and then relays 514 the initial data packet to the third node 508. In association with this functionality, the second node 506 may log an entry with a timestamp for the data packet in the MTN node trace files 114(1) (e.g., labeled "2" in FIG. 5). Similarly, the third node 508 receives the relayed data packet, may access, change and/or add routing information, and then relays 516 the data packet to the fourth node 504. Here, the third node 508 may log an entry with a timestamp for the data packet in the MTN node trace files 114(2) (e.g., labeled "3" in FIG. 5).

Then the fourth node 504 receives the initial data packet and generates and transmits 518 the response packet, logging an entry with a timestamp for the data packet received, and/or the response data packet response transmitted, in the server node trace files 116 (e.g., labeled "4" in FIG. 5). Similar to the uplink, the third node 508 and the second node 506 route and relay the response packet back to the first node 502 at 520 and 522, and log entries with timestamps for the response packet (e.g., labeled "5" and "6"). The first node 502 then logs an entry with a timestamp for the response packet (e.g., labeled "7" in FIG. 5), and the RTT is complete.

When the QoE optimization system 110 collects the trace files associated with the example timing diagram in FIG. 5, the QoE optimization system 110 may determine that the RTT 510 is longer than normal or longer than expected for the particular application being used at the first node 502. After this determination, the QoE optimization system 110 may utilize the merged trace files and the separate timestamps, as discussed above with respect to FIG. 4, to calculate individual packet communication delays between the nodes (whether uplink or downlink), and identify one or more nodes that may contribute most to the longer than expected RTT during the uplink and/or the downlink (e.g., at which node was the data packet delayed).

In various embodiments, the timing diagram 500 of FIG. 5 may be representative of a TCP handshake (e.g., a synchronize request and an acknowledgement response) between a client device 102 and a data server 108. In other embodiments, the timing diagram 500 of FIG. 5 may be representative of a DNS lookup between a client device 102 and a DNS server. In even further embodiments, the timing diagram 500 of FIG. 5 may be representative of an HTTP request and a data packet response between a client device 102 and a data server 108.

Figure 6:
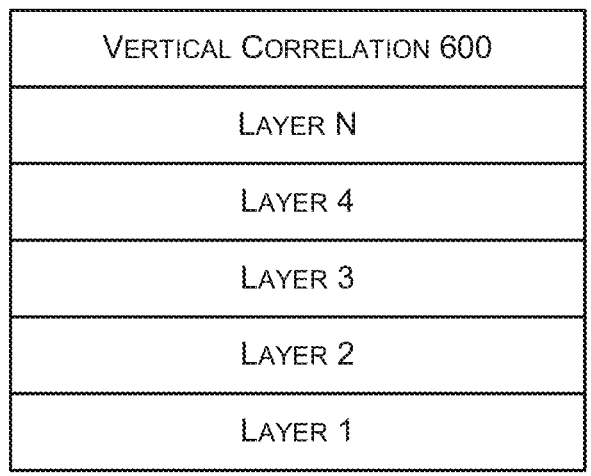
FIG. 6 is an example model that represents vertical correlation, in accordance with embodiments of the disclosure.

FIG. 6 illustrates an example of the vertical correlation 600 that represents packets as they are generated at and/or communicated amongst multiple different layers (e.g., 1 . . . N) of a communication protocol stack, such as communication protocol stack 222, at a single node. For example, the different layers may be associated with an OSI model and thus may be a physical layer, a data link layer, a network layer, a transport layer, a session layer, a presentation layer, and an application layer (as well as sublayers within the layers). Moreover, vertical correlation may use a vertical unique trace ID based on IP payloads to correlate the packets as they are communicated through the layers. Such vertical correlation is described above in greater detail with reference to FIG. 1B.

FIGS. 7-11 present illustrative processes. Each process is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes in FIGS. 7-11 are described with reference to the example environment 100 of FIG. 1A, the example architecture of FIG. 1B, the example components of FIGS. 2 and 4, the example data packet of FIG. 3A, the example trace file of FIG. 3B, the example timing diagram of FIG. 5, and/or the example vertical correlation of FIG. 6.

Figure 7:
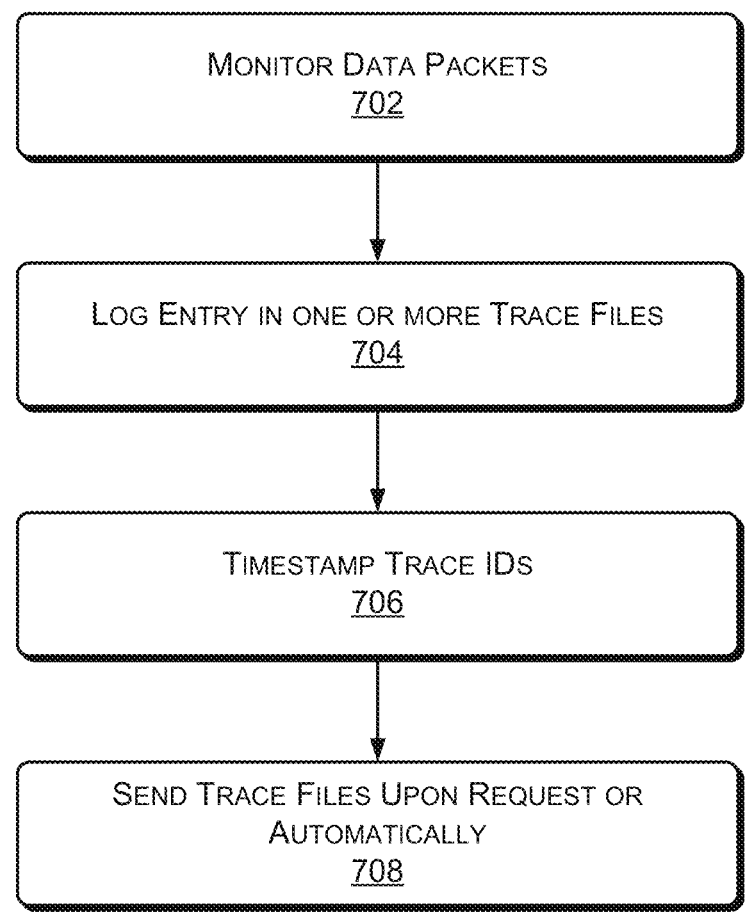
FIG. 7 is a flow chart of an example process for logging trace entries in a trace file, in accordance with embodiments of the disclosure.

FIG. 7 shows a flow diagram of an example process 700 for logging entries in a trace file. The example process 700 may be performed at a node that generates, communicates, receives, transmits, routes, relays, and/or stores a data packet (e.g., the client device 102, the MTN nodes 106(1) . . . 106(N), the data serves 108).

At block 702, a node monitors data packets that have been generated by, communicated through, received at, transmitted by, routed by, relayed by, and/or stored at the node. In various embodiments the monitoring may be at the node level (e.g., a single trace file for the node) or the layer level (e.g., multiple trace files for the node), as discussed above.

At block 704, the node creates and logs one or more entries for the monitored data packets in a trace file 306. As discussed above, each entry may include one or more fields that represent a trace ID 306 that distinguishes the data packet from other data packets. In various embodiments, the node may log separate entries for the data packet in different trace files associated with different layers for the node. Alternatively, the node may log separate entries for the data packet associated with different layers in a single trace file for the node.

At block 706, the node timestamps each trace ID 306 when logging the entry in the trace file 306. Accordingly, the node may access a time source to determine the timing information for each entry.

At block 708, the node sends the one or more trace files to the QoE optimization system 110. In various embodiments, the node may send the trace files to the QoE optimization system 110 in response to a request (e.g., periodic request or on-demand request) from the QoE optimization system 110. In an alternative embodiment, the node may be aware or a reporting schedule, and proactively send the trace files to the QoE optimization system 110 in accordance with the reporting schedule.

Figure 8:
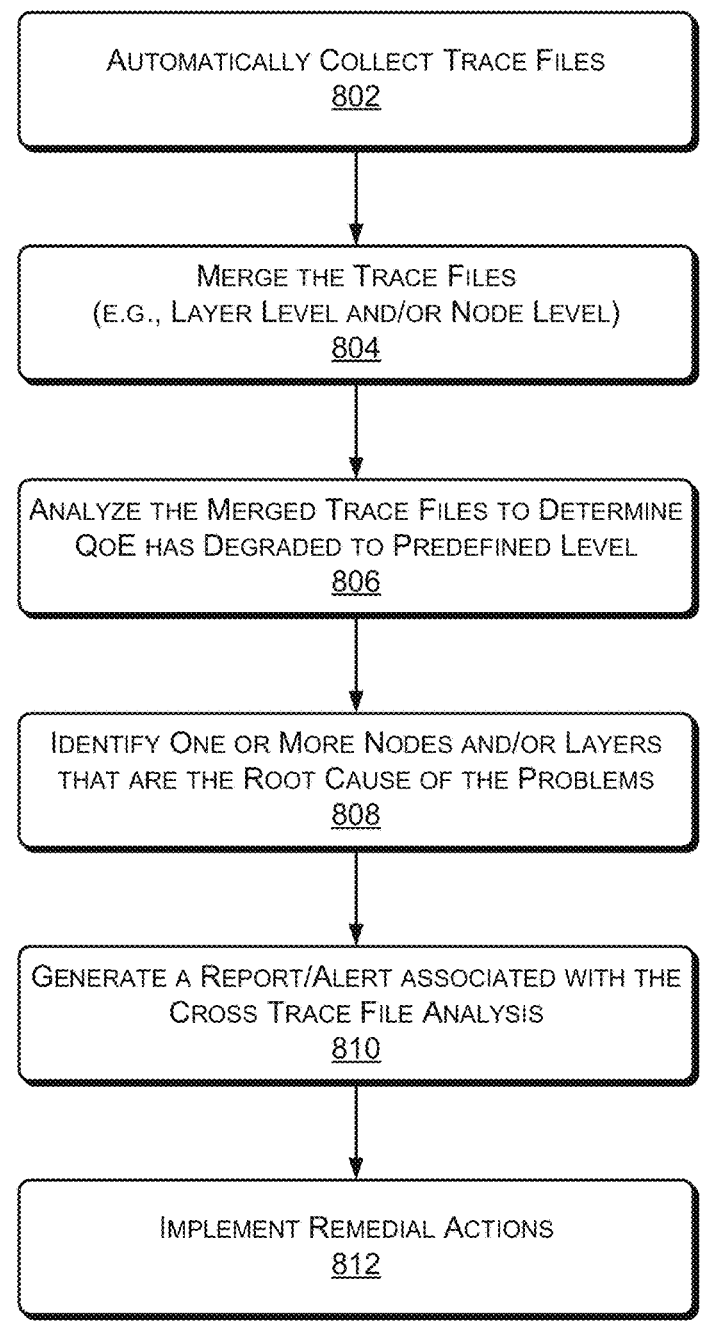
FIG. 8 is a flow chart of an example process for collecting and correlating the trace files so that network analysis can be performed, in accordance with embodiments of the disclosure.

FIG. 8 shows a flow diagram of an example process 800 for collecting trace files, merging the trace files, and performing network communications analysis. The example process 800 may be performed by the components that are part of the QoE optimization system 110.

At block 802, the trace file receiving module 410 may automatically collect the trace files from multiple nodes (e.g., the client device 102, the MTN nodes 106(1), and the data servers 108). In various embodiments, the trace file receiving module 410 may automatically collect the trace files in accordance with a periodic schedule. In various embodiments, the trace file receiving module 410 may automatically collect the trace files from an identified subset of nodes in the MTN 104.

At block 804, the trace file correlation module 414 merges the trace files collected. In various embodiments, the merging may include merging trace files corresponding to different layers at a single node (e.g., layer level), as well as merging trace files received from different nodes (e.g., node level).

At block 806, the cross file analysis module 416 analyzes the merged trace files to determine whether the QoE for users of client devices has degraded to a predefined level. In various embodiments, the cross file analysis module 416 performs analysis using timestamps of trace IDs that match a single data packet, a request/response packet pair, a group of data packets that are part of an established communication session. Moreover, as part of the analysis, the cross file analysis module 416 may identify (e.g., via the KPI module 420 and/or the controls module 418) one or more KPIs to evaluate and a particular service level or service goals associated with the KPI. The QoE may be found to be degraded to the predefined level if the particular service level is not being satisfied (e.g., webpage loading time is longer than two seconds, RTT is greater than one second, etc.). As part of the analysis, the cross file analysis module 416 may employ the trace sorting module 422 to sort the merged trace IDs so the analysis can be performed.

At block 808, the cross file analysis module 416 identifies one or more nodes and/or one or more layers within the identified nodes that may be the root cause of the problems contributing to the degraded QoE.

At block 810, the presentation and notification module 424 may format and generate a report or an alert to be conveyed via a GUI to a network administrator. The report or the alert may provide a result of the cross trace file analysis.

At block 812, the remedial action module 426 may implement remedial actions to address the problems contributing to the degraded QoE. In various embodiments, the remedial actions may be implemented automatically in accordance with predefined instructions in the controls module 418. In other embodiments, the remedial actions may be implemented in response to a selection and input provided to the controls module 418 by a network administrator.

Figure 9:
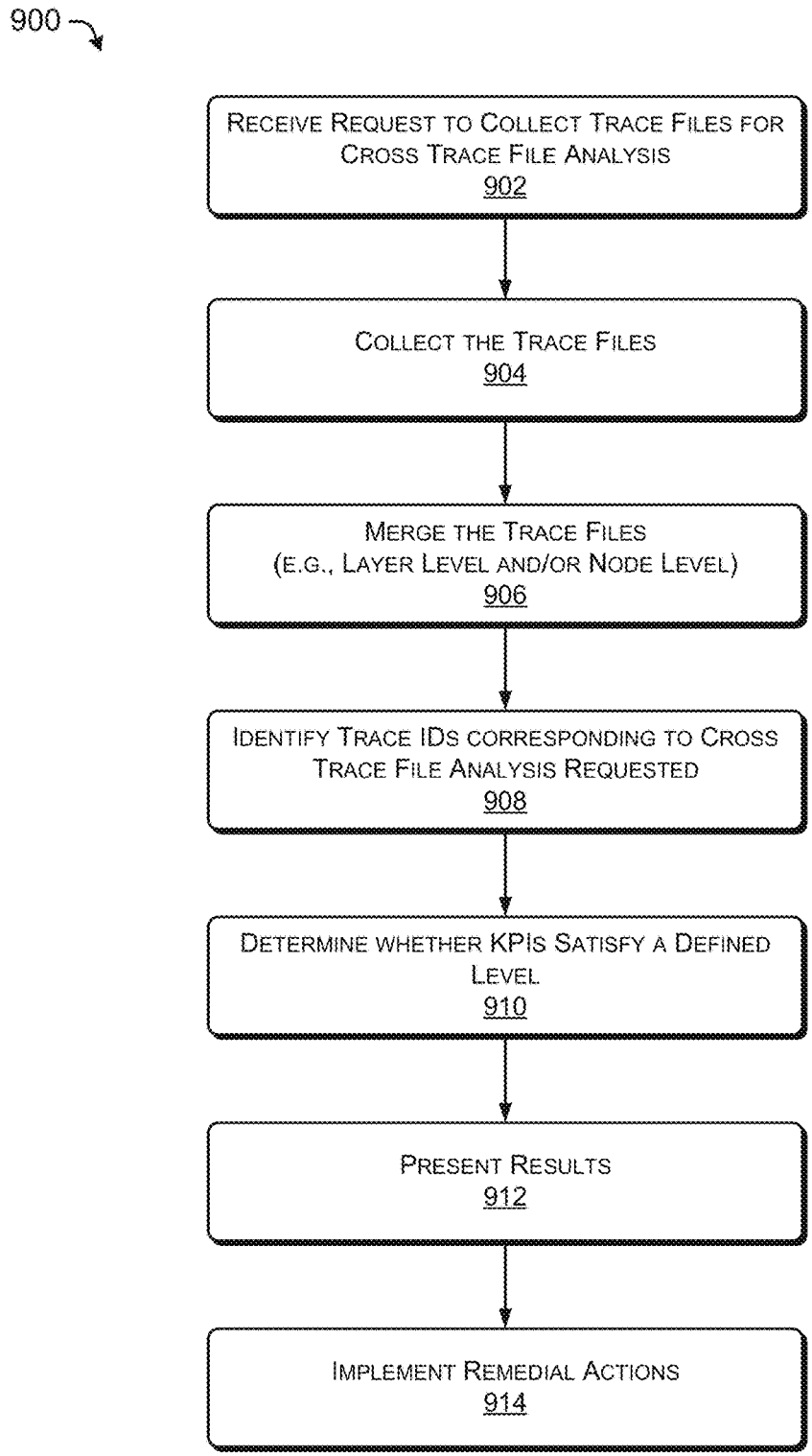
FIG. 9 is a flow chart of another example process for collecting and correlating the trace files so that network analysis can be performed, in accordance with embodiments of the disclosure.

FIG. 9 shows a flow diagram of another example process 900 for collecting trace files, merging the trace files, and performing network communications analysis. The example process 900 may be performed by the components that are part of the QoE optimization system 110.

At block 902, the controls module 418 may receive a request from a network administrator to collect trace files from multiple different nodes for cross trace file analysis.

At block 904, the trace file receiving module 410 may collect the trace files from multiple nodes (e.g., the client device 102, the MTN nodes 106(1), and the data servers 108).

At block 906, the trace file correlation module 414 merges the trace files collected. In various embodiments, the merging may include merging trace files corresponding to different layers at a single node (e.g., layer level), as well as merging trace files received from different nodes (e.g., node level).

At block 908, the cross file analysis module 416 may identify one or more trace IDs that provide a basis for the cross trace file analysis being requested.

At block 910, the cross file analysis module 416 may determine, based on the identified trace IDs, whether KPIs associated with the requested cross trace file analysis are satisfying a defined level.

At block 912, the presentation and notification module 424 may format and the results to a network administrator requesting the analysis.

At block 914, the remedial action module 426 may implement remedial actions to address the problems.

Figure 10:
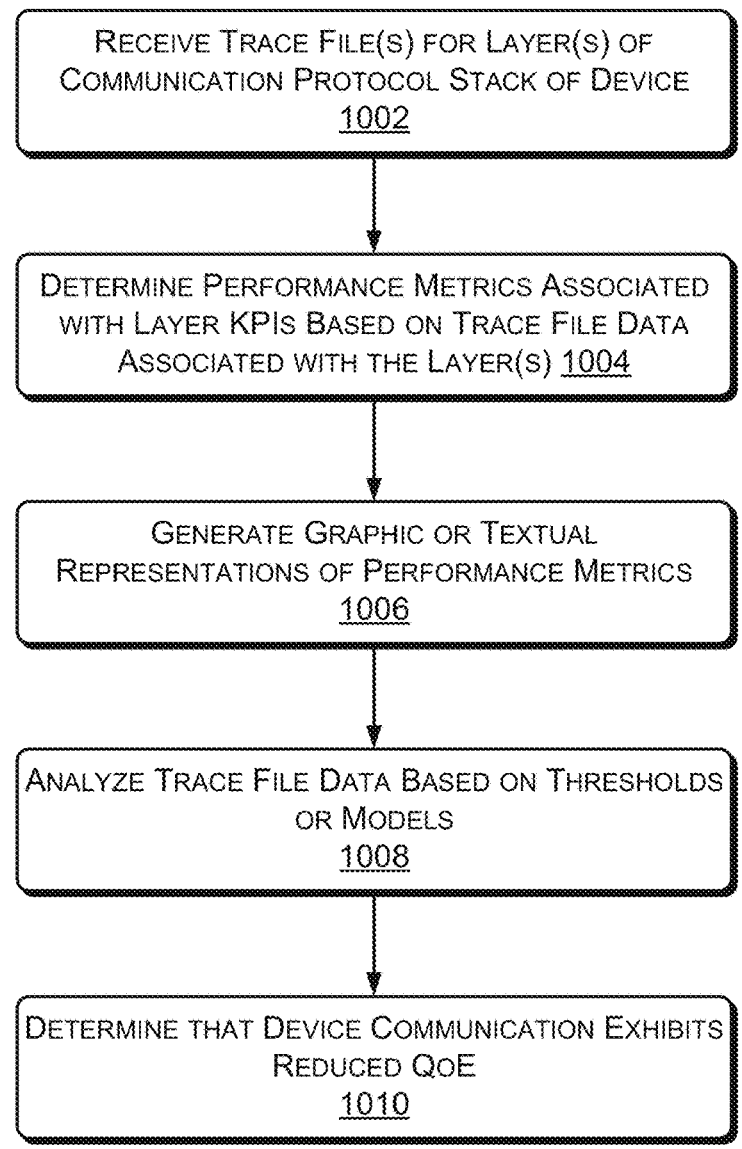
FIG. 10 shows a flow diagram of another example process for receiving a trace file, determining performance metrics for data included in the trace file, and generating graphic or textual representations of the performance metrics.

FIG. 10 shows a flow diagram of another example process 1000 for receiving a trace file, determining performance metrics for data included in the trace file, and generating graphic or textual representations of the performance metrics. The example process 1000 may be performed by the components that are part of the QoE optimization system 110.

At block 1002, the QoE optimization system 110 may receive a trace file from a device engaged in wireless communication. The trace file may include at least data associated with a radio layer of a communication protocol stack of the device. The device may be one of a user device, a telecommunications base station, a wireless access point, a radio network controller, or a core telecommunications network element. The trace file may be associated with a data collection and diagnostic logging tool for measuring radio frequency performance. In some embodiments, the trace file may also include data associated with an Internet layer, a network layer, or a transport layer of the communication protocol stack of the device. Alternatively, the QoE optimization system 110 may receive, at 1002, another trace file from the device, and the other trace file may include the data associated with the Internet layer, the network layer, or the transport layer of the communication protocol stack of the device.

At 1004, the QoE optimization system 110 may determine, for the device, one or more performance metrics associated with radio layer key performance indicators based at least in part on the data associated with the radio layer. The radio layer key performance indicators may include at least one of radio link control (RLC) retransmissions, packet loss, network signaling, radio resource control (RRC) state duration, radio state transition times, times spent in different radio states, number of radio state transitions, or reconfiguration response times. Also at 1004, the QoE optimization system 110 may determine, for the device, one or more additional performance metrics associated with key performance indicators for the Internet layer, the network layer, or the transport layer based at least in part on the data associated with the Internet layer, the network layer, or the transport layer. The key performance indicators for the Internet layer, the network layer, or the transport layer may include at least one of domain name service (DNS) round trip times (RTT), transmission control protocol (TCP) RTT, hypertext transfer protocol (HTTP) RTT, TCP retransmissions, TCP duplicate acknowledgements, TCP resets, TCP failures, delta frames, or sequence numbers.

At 1006, the QoE optimization system 110 may generate one or more graphic or textual representations of the one or more performance metrics. The graphic or textual representations include at least one of a graph, a chart, or a log representation (see, for example, FIGS. 12 and 13). Also, at 1006, the QoE optimization system 110 may generate one or more additional graphic or textual representations of the one or more additional performance metrics.

At 1008, the QoE optimization system 110 may analyze the data based on one or more of performance thresholds or performance models. At 1010, based on the analyzing, the QoE optimization system 110 may determine that the wireless communication exhibits a reduced QoE.

Figure 11:
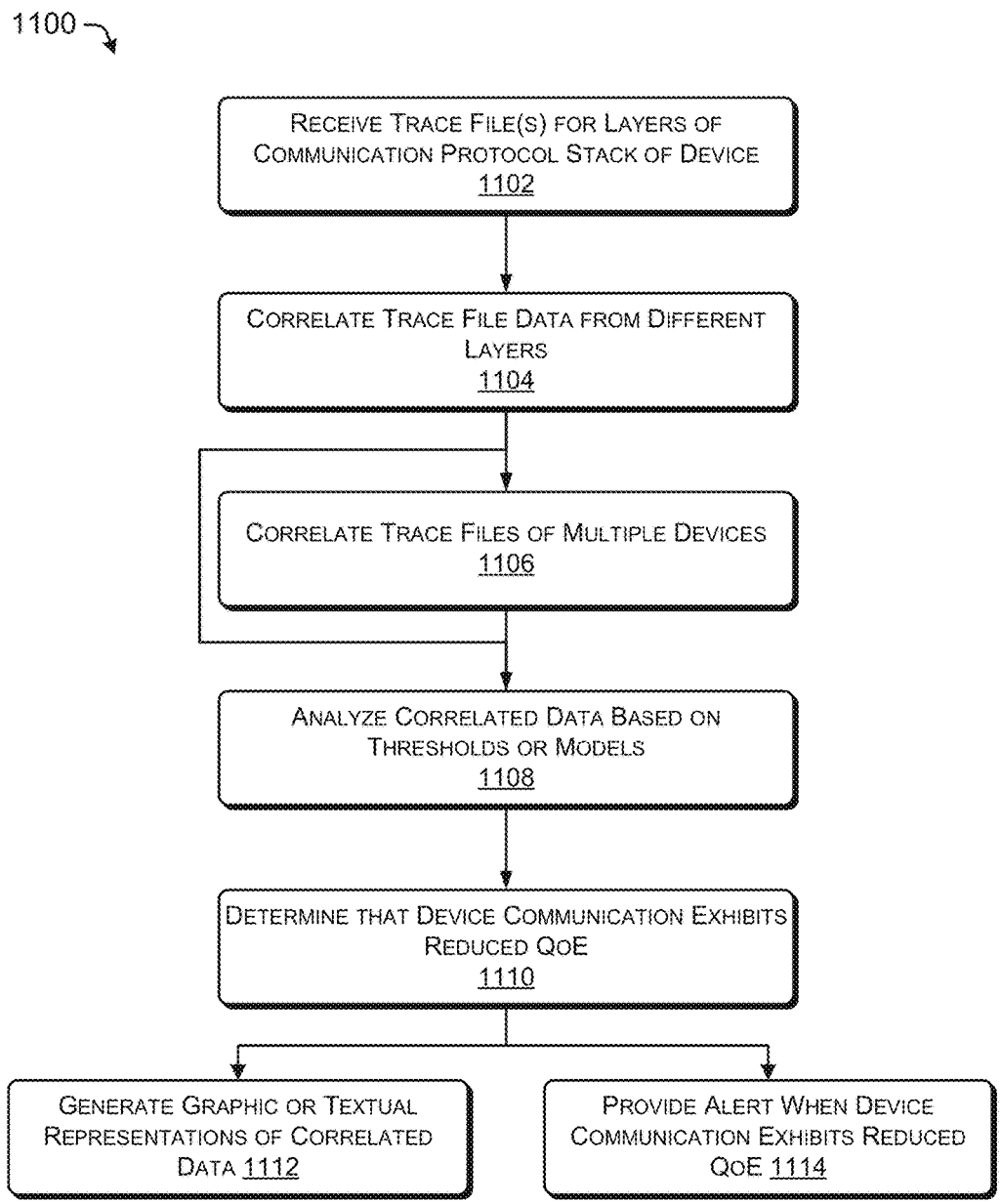
FIG. 11 shows a flow diagram of another example process for receiving trace file(s), correlating trace file data associated with different layers of a device or with different devices, analyzing the correlated data based on thresholds or models, and determining that communication associated with the correlated data exhibits a reduced QoE.

FIG. 11 shows a flow diagram of another example process 1100 for receiving trace file(s), correlating trace file data associated with different layers of a device or with different devices, analyzing the correlated data based on thresholds or models, and determining that communication associated with the correlated data exhibits a reduced QoE. The example process 1100 may be performed by the components that are part of the QoE optimization system 110.

At block 1102, the QoE optimization system 110 may receive a trace file from a device engaged in wireless packet-based communication. The trace file may include first data for a first layer of a communication protocol stack of the device and second data for a second layer of the communication protocol stack. The wireless packet-based communication may comprise data packets received at a user device from a remote service or remote website.

At 1104, the QoE optimization system 110 may correlate the first data with the second data based on a payload of a packet that is represented by the first data and the second data. The correlating may comprise correlating a representation of the payload in the first data with a representation of the payload in the second data.

At 1106, when multiple trace files are received from multiple devices engaged in or relaying the wireless packet-based communication, the QoE optimization system 110 may correlate those trace files.

At 1108, the QoE optimization system 110 may analyze the correlated data based on one or more of communication performance thresholds or communication performance models. If multiple trace files are correlated, the QoE optimization system 110 may also analyze the correlated trace files.

At 1110, based on the analyzing, the QoE optimization system 110 may determine that the wireless packet-based communication exhibits a reduced QoE.

At 1112, the QoE optimization system 110 may generate a graphic or textual representation of the correlated data. Alternatively or additionally, at 1114, the QoE optimization system 110 may provide an alert when the wireless packet-based communication exhibits a reduced QoE.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A method comprising:
receiving a first trace file from a first node, the first node comprising a device engaged in wireless communication with a mobile telecommunication network, the first trace file including data associated with a radio layer of a communication protocol stack of the device;
receiving a second trace file from a second node associated with the mobile telecommunication network, the second trace file comprising other data for a different layer than the radio layer of the communication protocol stack;
correlating the data with the other data based on a payload of a packet, the packet represented by the data and the other data;
determining one or more performance metrics associated with key performance indicators for the device based at least in part on the data and the other data; and
generating one or more graphic or textual representations of the one or more performance metrics.
2. The method of claim 1, wherein the key performance indicators include radio layer key performance indicators, which include at least one of radio link control (RLC) retransmissions, packet loss, network signaling, radio resource control (RRC) state duration, radio state transition times, times spent in different radio states, number of radio state transitions, or reconfiguration response times.

3. The method of claim 1, wherein at least one of the first trace file or the second trace file is associated with a data collection and diagnostic logging tool for measuring radio frequency performance.

4. The method of claim 1, wherein the different layer is one of an Internet layer, a network layer, or a transport layer of the communication protocol stack of the device.

5. The method of claim 4, wherein the key performance indicators include key performance indicators for the one of the Internet layer, the network layer, or the transport layer based at least in part on the data associated with the one of the Internet layer, the network layer, or the transport layer.

6. The method of claim 5, wherein the key performance indicators for the Internet layer, the network layer, or the transport layer include at least one of domain name service (DNS) round trip times (RTT), transmission control protocol (TCP) RTT, hypertext transfer protocol (HTTP) RTT, TCP retransmissions, TCP duplicate acknowledgements, TCP resets, TCP failures, delta frames, or sequence numbers.

7. The method of claim 1, wherein the graphic or textual representations include at least one of a graph, a chart, or a log representation.

8. The method of claim 1, further comprising:
analyzing the data and the other data based on one or more of performance thresholds or performance models; and
based on the analyzing, determining that the wireless communication exhibits a reduced quality of user experience (QoE).

9. The method of claim 1, wherein the device is one of a user device, a telecommunications base station, a wireless access point, a radio network controller, or a core telecommunications network element.

10. One or more non-transitory computer-readable media having computer-executable instructions stored thereon that, when executed by a computing device, cause the computing device to perform operations comprising:
receiving a first trace file from a device engaged in wireless packet-based communication with a mobile telecommunication network, the first trace file including first data for a first layer of a communication protocol stack of the device;
receiving a second trace file including second data for a second layer of the communication protocol stack, the second data being from a different layer than the first layer of the communication protocol stack;
correlating, as correlated data, the first data with the second data based on a payload of a packet, the packet represented by the first data and the second data;
analyzing the correlated data based on one or more of communication performance thresholds or communication performance models; and
based on the analyzing, determining that the wireless packet-based communication exhibits a reduced quality of user experience (QoE).

11. The one or more non-transitory computer-readable media of claim 10, wherein the operations further comprise:
generating a graphic or textual representation of the correlated data; or
providing an alert when the wireless packet-based communication exhibits a reduced QoE.

12. The one or more non-transitory computer-readable media of claim 10, wherein the correlating based on the payload of the packet comprises correlating a representation of the payload in the first data with a representation of the payload in the second data.

13. The one or more non-transitory computer-readable media of claim 10, wherein the operations further comprise correlating trace files of multiple devices engaged in or relaying the wireless packet-based communication.

14. The one or more non-transitory computer-readable media of claim 13, wherein the operations further comprise performing the analyzing on both the correlated data and based on the correlating the trace files.

15. A system comprising:
a processor;
a trace file receiving module configured to be operated by the processor to receive:
at least one trace file from each of a plurality of devices involved in communicating data packets, each trace file including data that is for the data packets and is associated with at least one different layer of a multi-layer communication protocol stack of a corresponding device;
a trace file correlation module configured to be operated by the processor to:
correlate, as correlated data packets, the data packets horizontally across the trace files for the plurality of devices, and
for a device each having two or more trace files that include data for multiple layers of the multi-layer communication protocol stack of the device, correlate the data packets vertically between the layers; and
a cross file analysis module configured to be operated by the processor to analyze the correlated data packets to identify one or more of the plurality of devices causing a problem that degrades a QoE associated with communicating the data packets.

16. The system of claim 15, further comprising a presentation and notification module to:
generate a graphic or textual representation of the correlated data packets; or
providing an alert when a problem that degrades the QoE associated with communicating the data packets is identified.

17. The system of claim 16, wherein the presentation and notification module further enables a user of the system to initiate a test communication of data packets.

18. The system of claim 15, wherein the trace file correlation module correlates the data packets horizontally based on trace identifiers associated with trace entries from the trace files.

19. The system of claim 15, wherein multiple trace files are collected from at least one node, each of the multiple trace files being associated with a layer of a communication protocol stack of the at least one node.

20. The system of claim 15, wherein the communicated data packets are received at a user device from a remote service or remote website.

* * * * *